United States Patent
Nagasaki

(10) Patent No.: US 9,231,934 B2
(45) Date of Patent: Jan. 5, 2016

(54) CONTROL SERVER, DATA PROCESSING DEVICE, AND CONTROL DEVICE FOR DATA PROCESSING DEVICE

(71) Applicant: Takeshi Nagasaki, Nagoya (JP)

(72) Inventor: Takeshi Nagasaki, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 47 days.

(21) Appl. No.: 14/075,435

(22) Filed: Nov. 8, 2013

(65) Prior Publication Data

US 2014/0137194 A1    May 15, 2014

(30) Foreign Application Priority Data

Nov. 14, 2012    (JP) .................................. 2012-249956

(51) Int. Cl.
*H04L 29/00* (2006.01)
*H04L 29/06* (2006.01)
(Continued)

(52) U.S. Cl.
CPC .............. *H04L 63/08* (2013.01); *G06F 3/1204* (2013.01); *G06F 3/1238* (2013.01); *G06F 3/1265* (2013.01); *G06F 3/1288* (2013.01); *G06F 3/1292* (2013.01); *G06F 17/30899* (2013.01); *H04L 47/70* (2013.01); *H04L 67/02* (2013.01); *H04L 67/28* (2013.01); *H04W 4/008* (2013.01); *H04W 12/06* (2013.01)

(58) Field of Classification Search
CPC ............. H04L 63/08; H04L 63/10; G06F 3/12
USPC ..................... 726/1–10, 26–31; 713/168–186; 709/217–229
See application file for complete search history.

(56) References Cited

U.S. PATENT DOCUMENTS 8,189,225 B1    5/2012    Lo et al.
2002/0035546 A1    3/2002    Aoki
(Continued)

FOREIGN PATENT DOCUMENTS

EP    0 889 636 A2    1/1999
JP    2002-063138 A    2/2002
(Continued)

OTHER PUBLICATIONS

Extended European Search Report dated Mar. 19, 2014 from related European Application No. 13 19 2531.5.
(Continued)

*Primary Examiner* — Madhuri Herzog
(74) *Attorney, Agent, or Firm* — Scully, Scott, Murphy & Presser, P.C.

(57) ABSTRACT

A control server may receive first location information indicating a location of specific web page data via a data processing device, in a case where a terminal device comprising a web browser receives the specific web page data from a specific service providing server by using a first type of wireless communication and sends the first location information to the data processing device by using a second type of wireless communication. The control server may cause a display unit of the data processing device to display at least N items of account information among M items of account information currently stored in the data processing device, in a case where the first location information is received. Each of the N items of account information may be available for receiving a data providing service from the specific service providing server.

11 Claims, 8 Drawing Sheets

(51) Int. Cl.
    *H04L 12/911*    (2013.01)
    *H04W 4/00*      (2009.01)
    *H04L 29/08*     (2006.01)
    *G06F 17/30*     (2006.01)
    *G06F 3/12*      (2006.01)
    *H04W 12/06*     (2009.01)

(56) References Cited

U.S. PATENT DOCUMENTS

| | | | |
|---|---|---|---|
| 2005/0213147 A1* | 9/2005 | Minatogawa | 358/1.15 |
| 2005/0231754 A1* | 10/2005 | Uchida | 358/1.15 |
| 2010/0107222 A1* | 4/2010 | Glasser | 726/3 |
| 2011/0218996 A1 | 9/2011 | Jin et al. | |
| 2012/0110066 A1* | 5/2012 | Furuta et al. | 709/203 |
| 2012/0113464 A1 | 5/2012 | Inoue et al. | |
| 2012/0147420 A1 | 6/2012 | Nishimi et al. | |

FOREIGN PATENT DOCUMENTS

| | | |
|---|---|---|
| JP | 2002215499 A | 8/2002 |
| JP | 2004-334511 A | 11/2004 |
| JP | 2004-348652 A | 12/2004 |

OTHER PUBLICATIONS

Chinese Office Action dated Nov. 4, 2015 issued in corresponding Chinese Patent Application No. 201310566317.7.

* cited by examiner

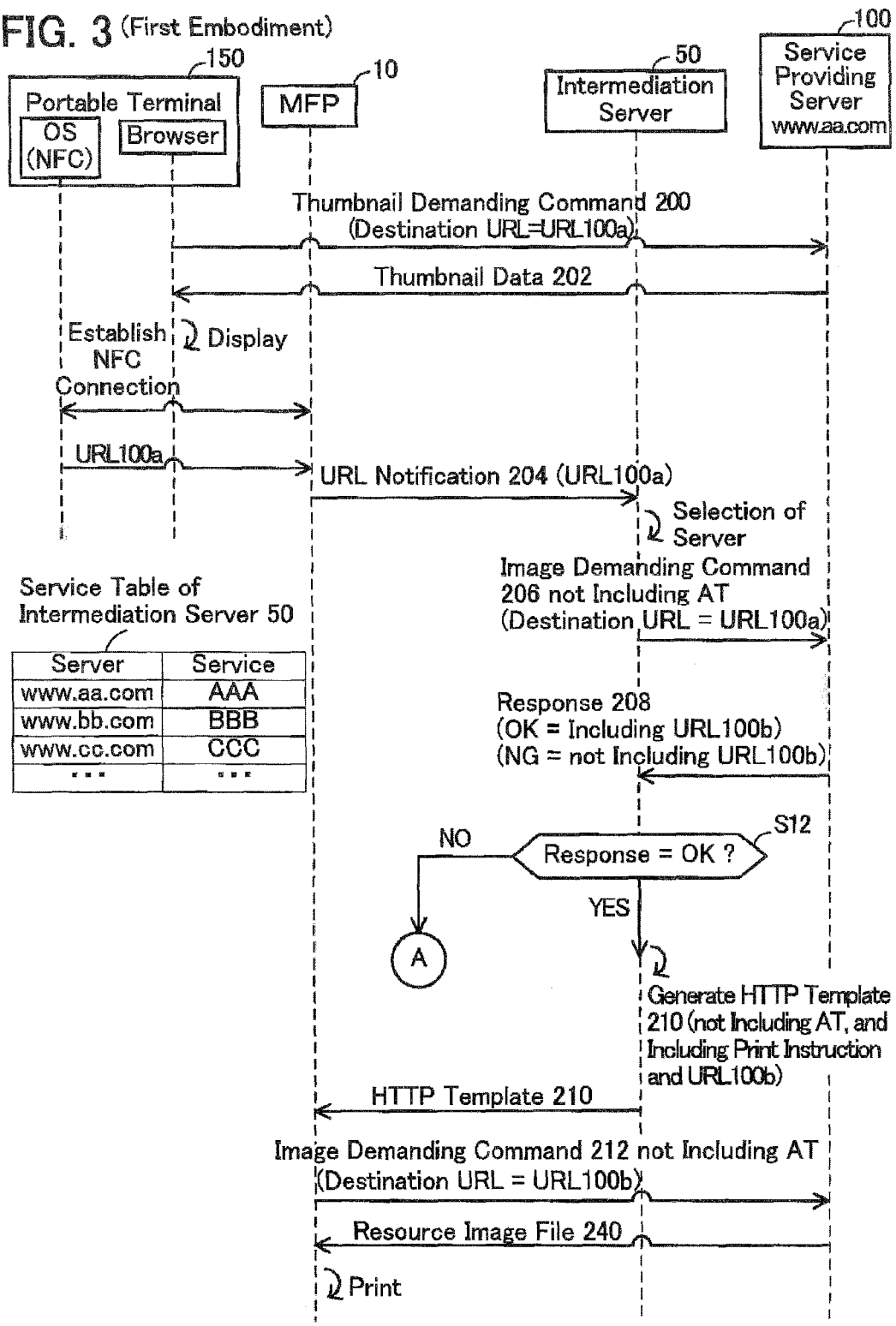

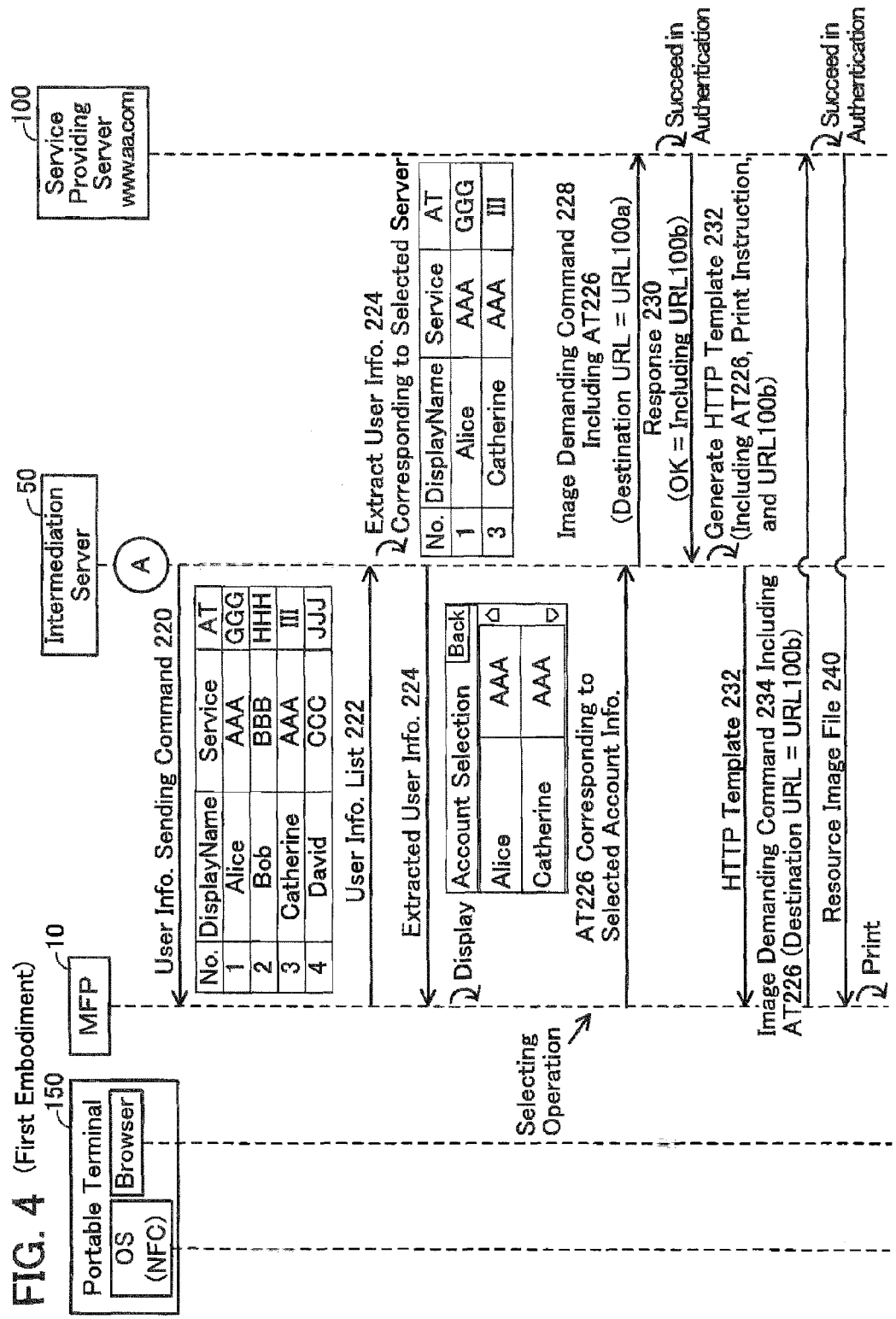
FIG. 4 (First Embodiment)

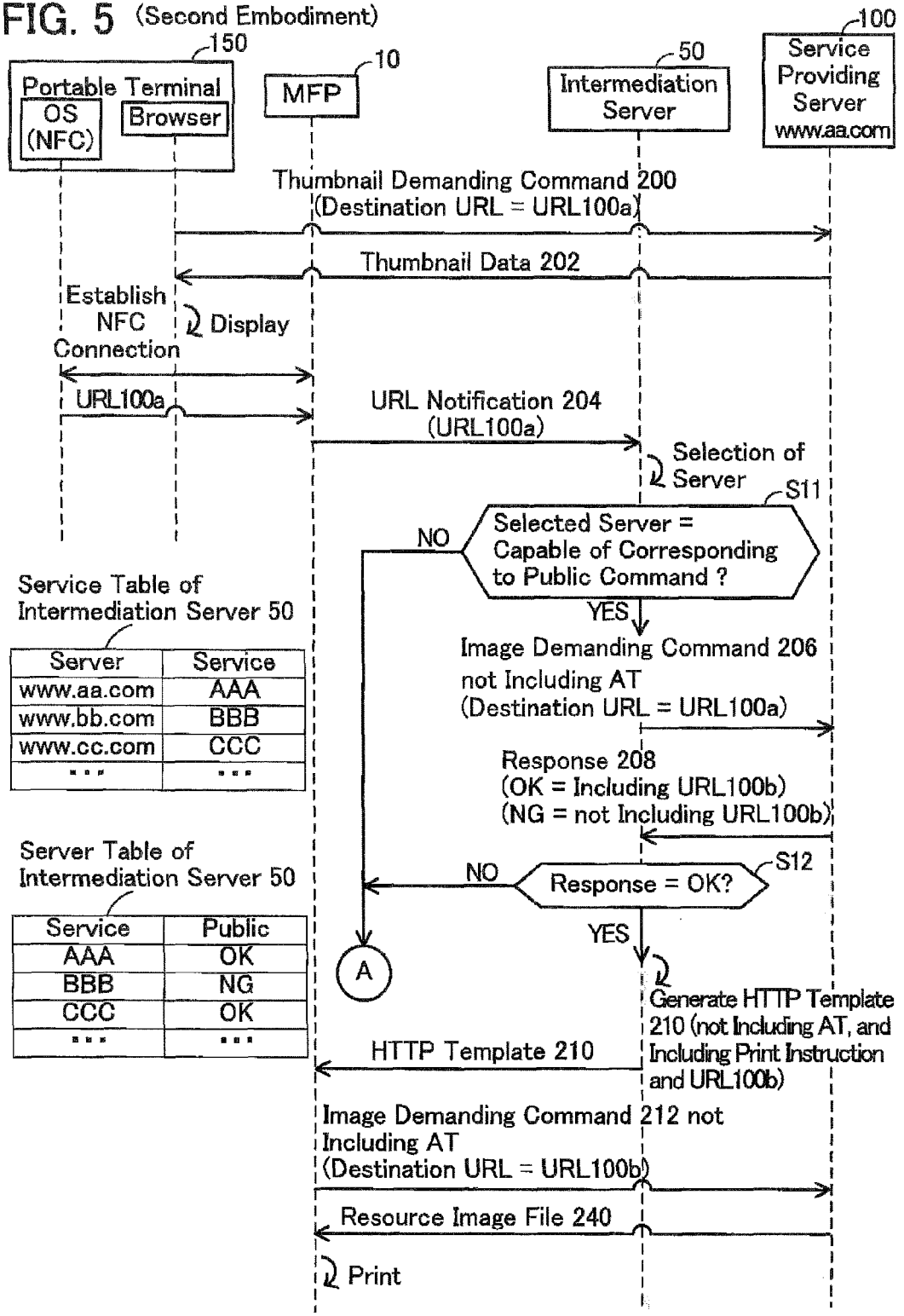

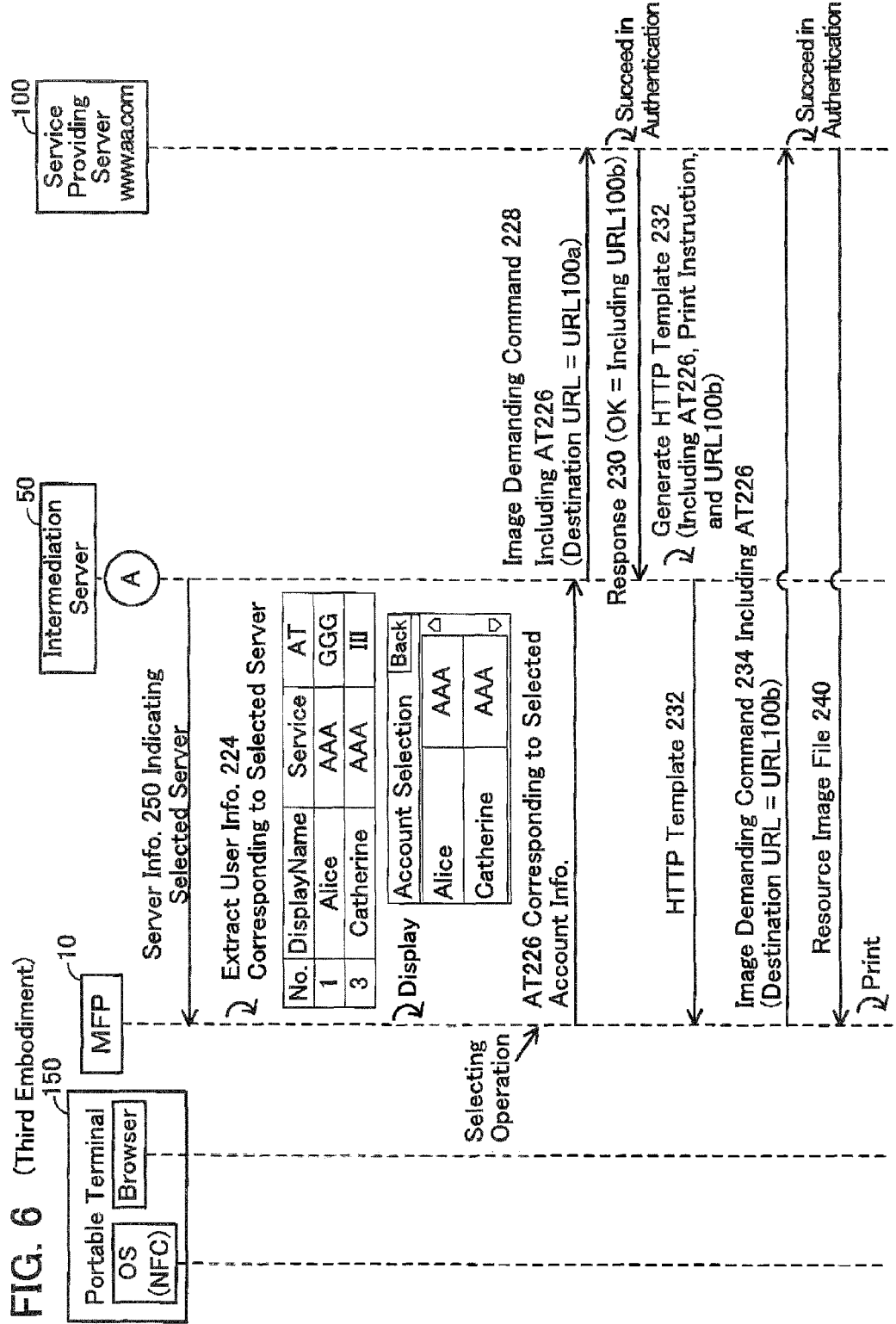
FIG. 6 (Third Embodiment)

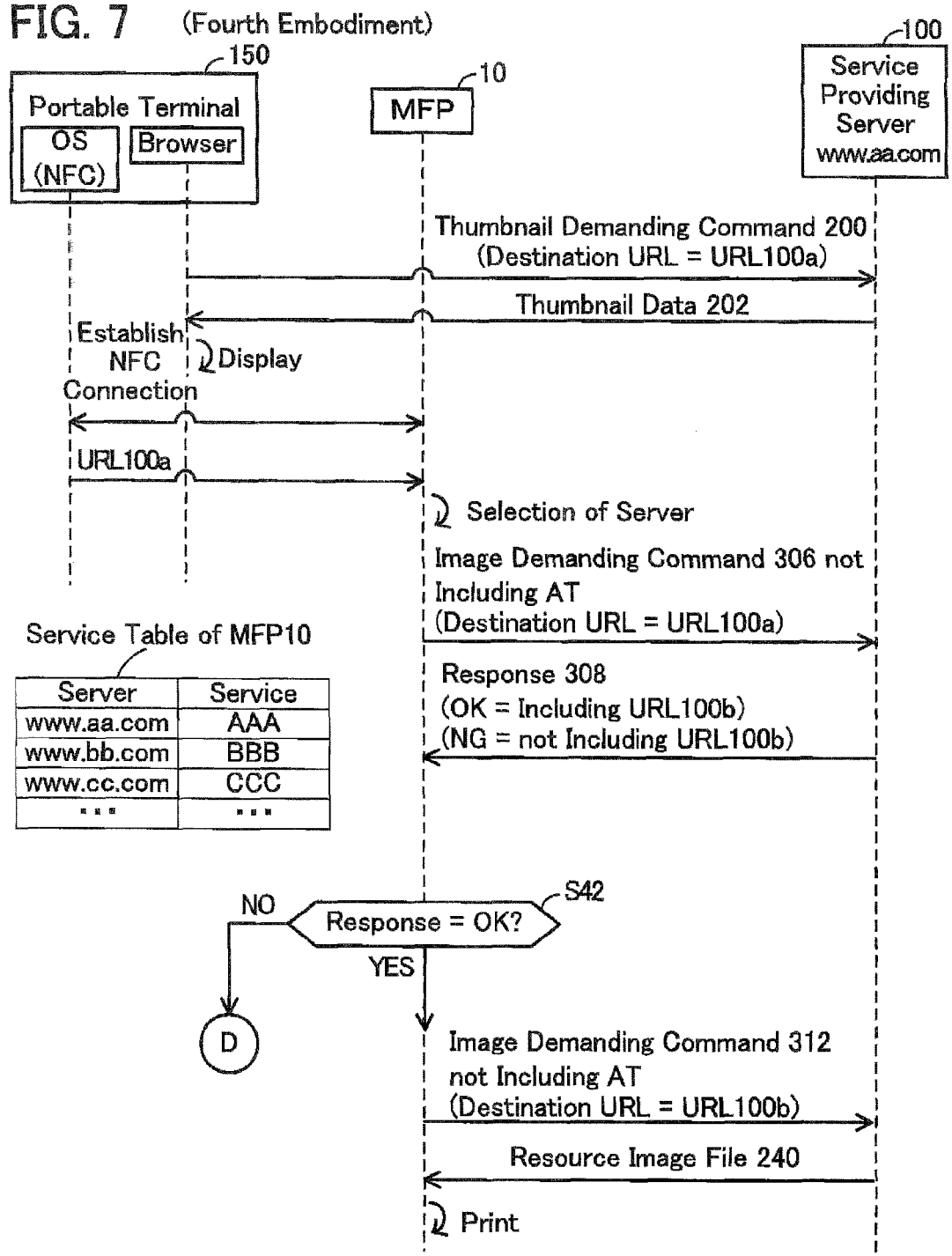

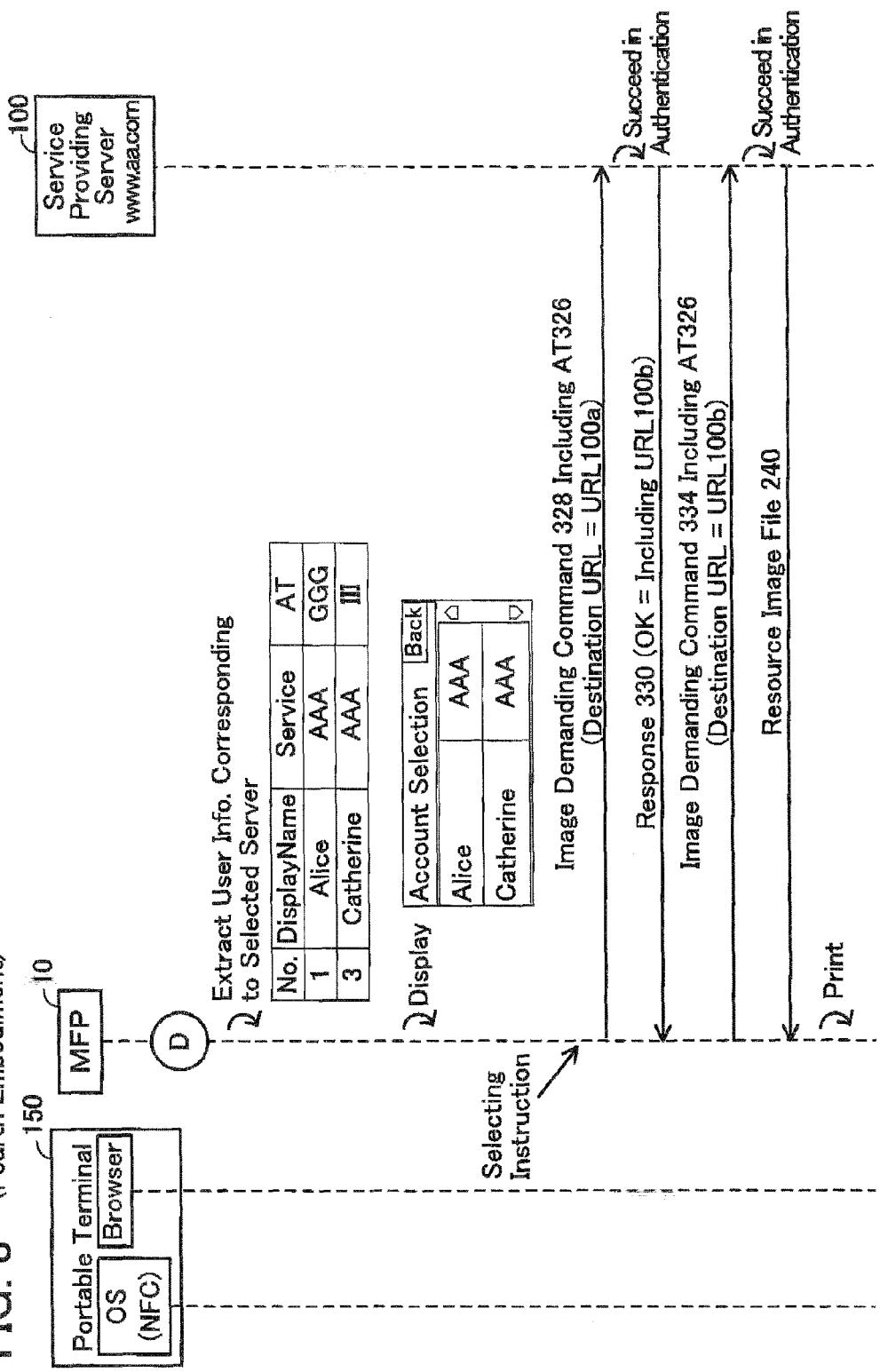

US 9,231,934 B2

CONTROL SERVER, DATA PROCESSING DEVICE, AND CONTROL DEVICE FOR DATA PROCESSING DEVICE

CROSS-REFERENCE TO RELATED APPLICATIONS

This application claims priority to Japanese Patent Application No. 2012-249956, filed on Nov. 14, 2012, the contents of which are hereby incorporated by reference into the present application.

TECHNICAL FIELD

The present specification discloses a technique for receiving location information indicating a location of web page data, and executing a process.

DESCRIPTION OF RELATED ART

A user terminal comprising a web browser is known. A user registers delivery service information (i.e., service ID, service name, URL) and information relating to authentication (i.e., service ID, user ID, password) in the user terminal. Then, the user selects a desired delivery service from a delivery service list created from the registered delivery service information. In this case, the user terminal sends the registered user ID and password to a system which executes an information delivery service. Thereby, the user can receive the information delivery service without inputting the user ID and password.

SUMMARY

In the present specification, a technique is taught that receives location information indicating a location of web page data and may execute an appropriate process in a case where a terminal device sends the location information by using a short distance wireless communication.

One aspect disclosed in the present specification may be a control server. The control server may comprise a processor. The processor may be configured to perform: receiving first location information indicating a location of specific web page data via a data processing device, in a case where a terminal device comprising a web browser receives the specific web page data from a specific service providing server by using a first type of wireless communication and sends the first location information to the data processing device by using a second type of wireless communication, the second type of wireless communication being a short distance wireless communication having a shorter wireless communication distance than the first type of wireless communication; and causing a display unit of the data processing device to display at least N items of account information among M items of account information currently stored in the data processing device, in a case where the first location information is received, the M being an integer of two or more, the N being an integer which is one or more and is equal to the M or less, each of the N items of account information being available for receiving a data providing service from the specific service providing server.

One aspect disclosed in the present specification may be a data processing device. The data processing device may comprise: an interface for a second type of wireless communication, the second type of wireless communication being a short distance wireless communication having a shorter wireless communication distance than a first type of wireless communication; a memory; a display unit; and a processor. The processor may be configured to perform: receiving first location information indicating a location of specific web page data via the interface, in a case where a terminal device comprising a web browser receives specific web page data from a specific service providing server by using the first type of wireless communication and sends the first location information by using the second type of wireless communication; and causing the display unit to display at least N items of account information among M items of account information currently stored in the memory, in a case where the first location information is received, the M being an integer of two or more, the N being an integer which is one or more and is equal to the M or less, each of the N items of account information being available for receiving a data providing service from the specific service providing server.

One aspect disclosed in the present specification may be a control device for a data processing device. The control device may comprise a processor. The processor may be configured to perform: receiving first location information indicating a location of specific web page data, in a case where a terminal device comprising a web browser receives the specific web page data from a specific service providing server by using a first type of wireless communication and sends the first location information by using a second type of wireless communication, the second type of wireless communication being a short distance wireless communication having a shorter wireless communication distance than the first type of wireless communication; sending a specific command not including authentication information to the specific service providing server by using the first location information; receiving a specific response from the specific service providing server, the specific response being a response which is sent from the specific service providing server in a case where the specific service providing server is capable of executing a data providing service in response to the specific command; and executing a specific process in a case where the specific response is received, the specific process including a process of causing a print execution unit of the data processing device to execute a print according to an image file corresponding to a target image represented by the specific web page data.

A control method, a computer program, and computer-readable instructions for realizing any of the apparatuses described above (i.e., control server, data processing device, or control device), and a non-transitory computer-readable medium which stores the computer program or the computer-readable instructions, are also novel and useful.

BRIEF DESCRIPTION OF THE DRAWINGS

FIG. 3 shows a sequence diagram of processes executed by devices of a first embodiment.

FIG. 4 shows a sequence diagram of a continuation of FIG. 3.

FIG. 5 shows a sequence diagram of processes executed by devices of a second embodiment.

FIG. 6 shows a sequence diagram of processes executed by devices of a third embodiment.

FIG. 7 shows a sequence diagram of processes executed by devices of a fourth embodiment.

FIG. 8 shows a sequence diagram of a continuation of FIG. 7.

EMBODIMENT

First Embodiment

Configuration of System

Figure 1:
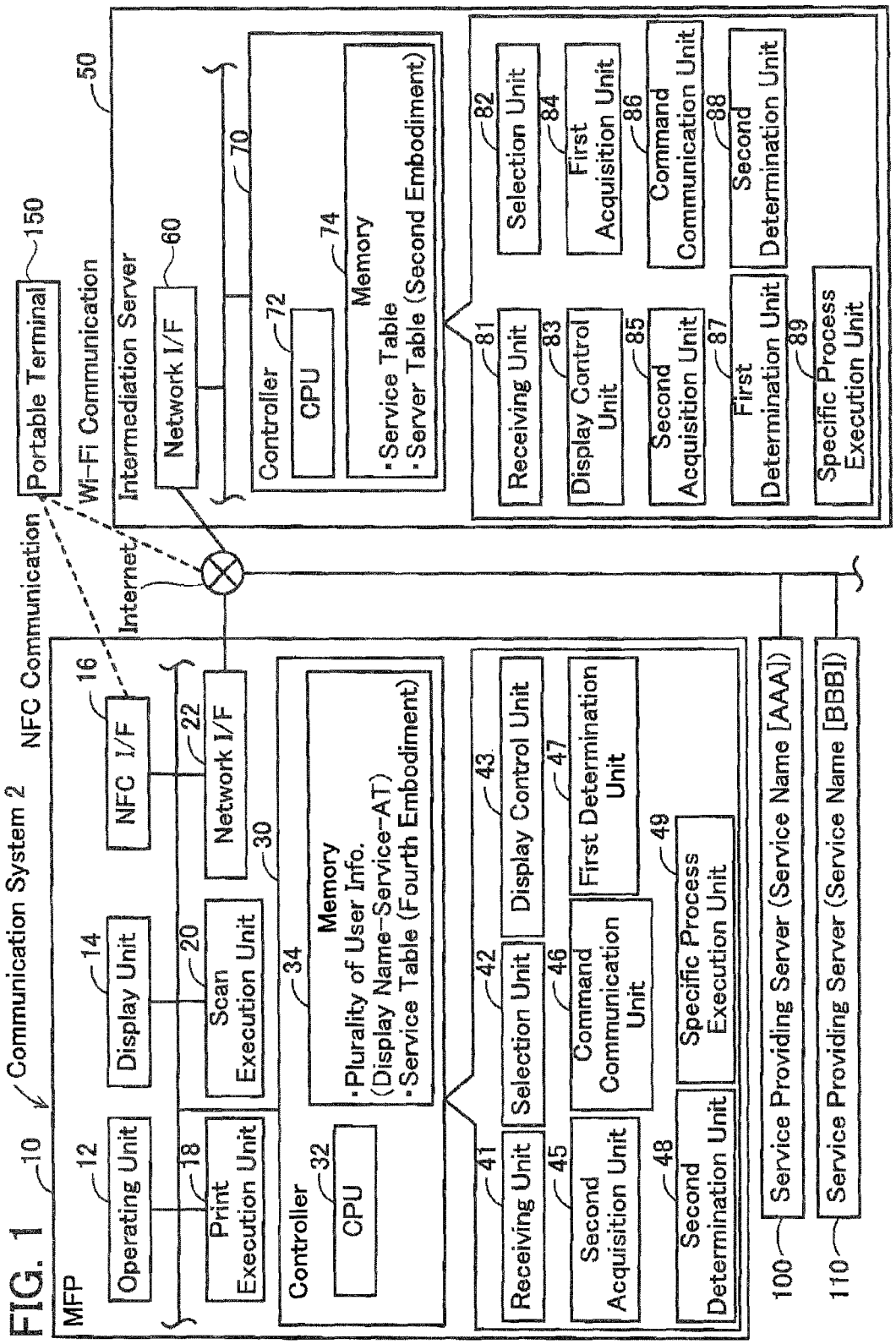
FIG. 1 shows the configuration of a communication system.

As shown in FIG. 1, a communication system 2 comprises an MFP (an abbreviation of Multi-Function Peripheral) 10, an intermediation server 50, a plurality of service providing servers 100, 110, and a portable terminal 150. The devices 10, 50, 100, 110, 150 can be connected to an internet. Further, the MFP 10 and the portable terminal 150 are each capable of executing an NFC (an abbreviation of Near Field Communication) communication.

(Configuration of MFP 10)

The MFP 10 is a peripheral device capable of executing multiple functions such as a print function, scan function, copy function, FAX function, etc. The MFP 10 comprises an operating unit 12, a display unit 14, an NFC I/F (an abbreviation of NFC Interface) 16, a print execution unit 18, a scan execution unit 20, a network I/F 22 and a controller 30. The operating unit 12 comprises a plurality of keys. A user can input various instructions to the MFP 10 by operating the operating unit 12. The display unit 14 can display various types of information. The print execution unit 18 comprises an ink jet method, laser method, etc. printing mechanism. The scan execution unit 20 comprises a CCD, CIS, etc. scanning mechanism.

The NFC I/F 16 is an interface for executing an NFC scheme wireless communication. The NFC scheme is a wireless communication scheme for executing a so-called short distance wireless communication, being e.g., a wireless communication scheme based on international standards ISO/IEC21481 or 18092. The network I/F 22 is an interface for connecting with a LAN (an abbreviation of Local Area Network). The network I/F 22 may be an interface connected with a wired LAN, or may be an interface connected with a wireless LAN. The MFP 10 can be connected with the internet via the network I/F 22 (i.e., via the LAN).

The controller 30 comprises a CPU 32 and a memory 34. The CPU 32 executes various processes according to a program that is stored in the memory 34. The functions of units 41 to 49 are realized by the CPU 32 executing processes according to the above program. In addition to the above program, the memory 34 stores a plurality of user information. Moreover, in FIG. 1, a service table is stored in the memory 34. However, the service table is used in a fourth embodiment (to be described).

Each of the plurality of user information is user information being capable of receiving a service from the service providing servers 100, 110 (to be described). The user information is information in which display name, service name, and access token (called "AT" below) are associated. Moreover, below, the display name and service name are referred to together as "account information". Consequently, the user information is information in which the account information (i.e., the display name and service name) and the AT are associated.

The display name is a name for a display of the user on the MFP 10. The service name is a name for a service providing server (e.g., 100) from which the user can receive a service. The AT is authentication information provided from a service providing server (e.g., 100), and is used for authentication in the service providing server. The manner of storing the user information in the memory 34 will be described later.

(Configuration of Intermediation Server 50)

The intermediation server 50 is a server provided by a vendor of the MFP 10, and is a server for intermediating provision of service to the MFP 10 from the service providing servers 100, 110. The intermediation server 50 comprises a network I/F 60 and a controller 70. The intermediation server 50 is capable of connecting with the internet via the network I/F 60.

The controller 70 comprises a CPU 72 and a memory 74. The CPU 72 executes various processes according to the program that is stored in the memory 74. The functions of units 81 to 89 are realized by the CPU 72 executing processes according to the above program. In addition to the above program, the memory 74 stores a service table (to be described; see FIG. 3). Moreover, in FIG. 1, a server table is stored in the memory 74. However, the server table is used in a second embodiment (to be described).

(Configuration of Service Providing Servers 100, 110)

The service providing servers 100, 110 are each a known service providing server, e.g., "Evernote (registered trademark)", "Google (registered trademark) Docs", "PICASA (registered trademark)", "Facebook (registered trademark)", etc. In the present embodiment, a name (i.e., service name) of the service providing servers 100, 110 is "AAA", "BBB" respectively. The service providing servers 100, 110 are capable of executing a data storing service of acquiring data from a communication apparatus (e.g., the portable terminal 150, the MFP 10) and storing the data. Further, the service providing servers 100, 110 are capable of executing a data providing service of providing data to a communication apparatus.

The service providing server 100 is a server provided by a first service provider (i.e., a first company), and the service providing server 110 is a server provided by a second service provider (i.e., a second company) which is different from the first service provider. The first service provider releases a first API (an abbreviation of Application Program Interface) for receiving a service from the service providing server 100, and the second service provider releases a second API for receiving a service from the service providing server 110. Since the first service provider and the second service provider are different, the first API and the second API are usually different. In order to receive services from, e.g., both the service providing servers 100, 110, a communication apparatus must comprise both the first API (i.e., a first program) and the second API (i.e., a second program).

For example, in order for the MFP 10 to receive a service from each of the plurality of service providing servers 100, 110, the MFP 10 must comprise a plurality of APIs and consequently must store many programs. However, storage capacity of the memory 34 of the MFP 10 is less than that of a PC, etc. Consequently, in the present embodiment, the intermediation server 50 is provided so that, without storing many programs in the MFP 10, the MFP 10 can receive a service from each of the plurality of service providing servers 100, 110.

The intermediation server 50 comprises a plurality of APIs corresponding to the plurality of service providing servers 100, 110. In order for the MFP 10 to receive a service from the service providing servers 100, 110, the intermediation server 50 executes various communications (e.g., the communication of a command 206, etc. of FIG. 3, to be described) with the service providing servers 100, 110 by using the APIs corresponding to the service providing servers 100, 110. Thereby, the MFP 10 can receive a service from the service providing servers 100, 110 even without comprising APIs corresponding to the service providing servers 100, 110 (i.e., even without storing many programs). Further, in case a specification change of the service providing servers 100, 110 is performed, it is possible to correspond to the specification change by changing a program of the intermediation server 50 without changing a program of the MFP 10. Further, if a program of the intermediation server 50 is changed so as to comprise an API corresponding to a novel service providing server, the MFP 10 can receive a service from the novel service providing server even without changing a program of the MFP 10.

(Configuration of Portable Terminal 150)

The portable terminal 150 is a transportable terminal such as, e.g., a mobile phone (e.g., smart phone), PDA, notebook PC, tablet PC, portable music playback device, portable film playback device, etc. Although not shown, the portable terminal 150 comprises an interface for executing an NFC communication, and an interface for executing a wireless communication based on a wireless communication standards defined by Wi-Fi Alliance. Below, the latter wireless communication is called "Wi-Fi communication". The portable terminal 150 is capable of executing the Wi-Fi communication and connecting with the internet. Moreover, in the present embodiment, a situation is assumed in which the portable terminal 150 and the MFP 10 are not connected with the same LAN.

Here, differences between the NFC communication and the Wi-Fi communication will be described. As described above, the NFC communication is a wireless communication based on, e.g., international standards ISO/IEC21481 or 18092. By contrast, the Wi-Fi communication is a wireless communication based on, e.g., IEEE (an abbreviation of The Institute of Electrical and Electronics Engineers, Inc.) standard 802.11 and standards conforming thereto (e.g., 802.11a, 11b, 11g, 11n, etc.). A Communication speed of the NFC communication (e.g., maximum communication speed being equal to 100 to 424 Kbps) is slower than a communication speed of the Wi-Fi communication (e.g., the maximum communication speed being equal to 11 to 600 Mbps). Further, a frequency of a carrier wave in the NFC communication (e.g., 13.56 MHz band) is different from a frequency of a carrier wave in the Wi-Fi communication (e.g., 2.4 GHz band or 5.0 GHz band). Further, possible communication distance of the NFC communication (e.g., 10 cm or less) is shorter than possible communication distance of the Wi-Fi communication (e.g., 100 m or less).

The portable terminal 150 comprises a known OS program that supports the NFC communication and the Wi-Fi communication (e.g., Android (registered trademark)). The portable terminal 150 further comprises a known web browser program. Furthermore, the portable terminal 150 further comprises the first and the second APIs corresponding to the service providing servers 100, 110. The portable terminal 150 does not comprise a particular application program (e.g., printer driver program, scanner driver program) for causing the MFP 10 to execute a function (e.g., print function, scan function).

(Advance Preparation by User)

In order for the MFP 10 to receive a service from the service providing servers 100, 110, the user executes the following advance preparation. For example, using a PC (not shown), the user accesses the intermediation server 50, selects the service name "AAA" of the service providing server 100, and then selects "acquire AT". In this case, the controller 70 of the intermediation server 50 sends, to the PC, a specific URL (an abbreviation of Uniform Resource Locator) for accessing the service providing server 100. By using the specific URL, the user accesses the service providing server 100 from the PC. Thereby, the PC causes a log-in screen for logging into the service providing server 100 to be displayed.

Next, the user inputs an account name and password via the PC, and executes an authentication procedure. When the authentication succeeds, the service providing server 100 creates an AT for the user, and sends the AT to the intermediation server 50. Upon receiving the AT from the service providing server 100, the controller 70 of the intermediation server 50 creates a temporary ID, and sends the temporary ID to the PC. The PC causes the temporary ID to be displayed. Thereby, the user can learn the temporary ID displayed on the PC.

Next, by operating the operating unit 12 of the MFP 10, the user selects the service name "AAA" of the service providing server 100 and, further, inputs a desired display name (e.g., "Alice") into the MFP 10. By operating the operating unit 12 of the MFP 10, the user further inputs the temporary ID displayed on the PC into the MFP 10. In this case, the controller 30 of the MFP 10 sends the temporary ID to the intermediation server 50. Thereby, the controller 70 of the intermediation server 50 sends the AT to the MFP 10.

When the aforementioned processes are executed, the controller 30 of the MFP 10 can add one item of user information to the memory 34. That is, the controller 30 of the MFP 10 can store, in the memory 34, one item of user information in which the following are associated: the display name (e.g., "Alice") input by the user; the service name "AAA" selected by the user; and the AT received from the intermediation server 50.

Moreover, in the same manner as above, the controller 30 of the MFP 10 can store, in the memory 34, user information corresponding to the service providing server 110 having the service name "BBB". Further, in the present embodiment, a situation is assumed in which the MFP 10 is used in common by a plurality of users. Consequently, the controller 30 of the MFP 10 can store a plurality of user information corresponding to the plurality of users in the memory 34. Consequently, e.g., as shown in FIG. 4, the memory 34 can store a plurality of user information (four items of user information No. 1 to No. 4 in the example of FIG. 4).

(Processes Executed by Devices)

Next, contents of processes executed by the devices 10, 50, 100, 150 will be described. Below, the user of the portable terminal 150 is called a "target user". The target user, e.g., logs into the service providing server 100 of "Facebook (registered trademark)", etc. by using the portable terminal 150, and uploads, in advance, a resource image file (e.g., a resource image file representing a resource image included in a lower diagram in FIG. 2) to the service providing server 100. As described above, since the portable terminal 150 comprises the first API corresponding to the service providing server 100, the uploading can be executed according to the first API. The resource image file is, e.g., a file having a format such as JPEG (an abbreviation of Joint Photographic Experts Group), PDF (an abbreviation of Portable Document Format), etc.

Figure 2:
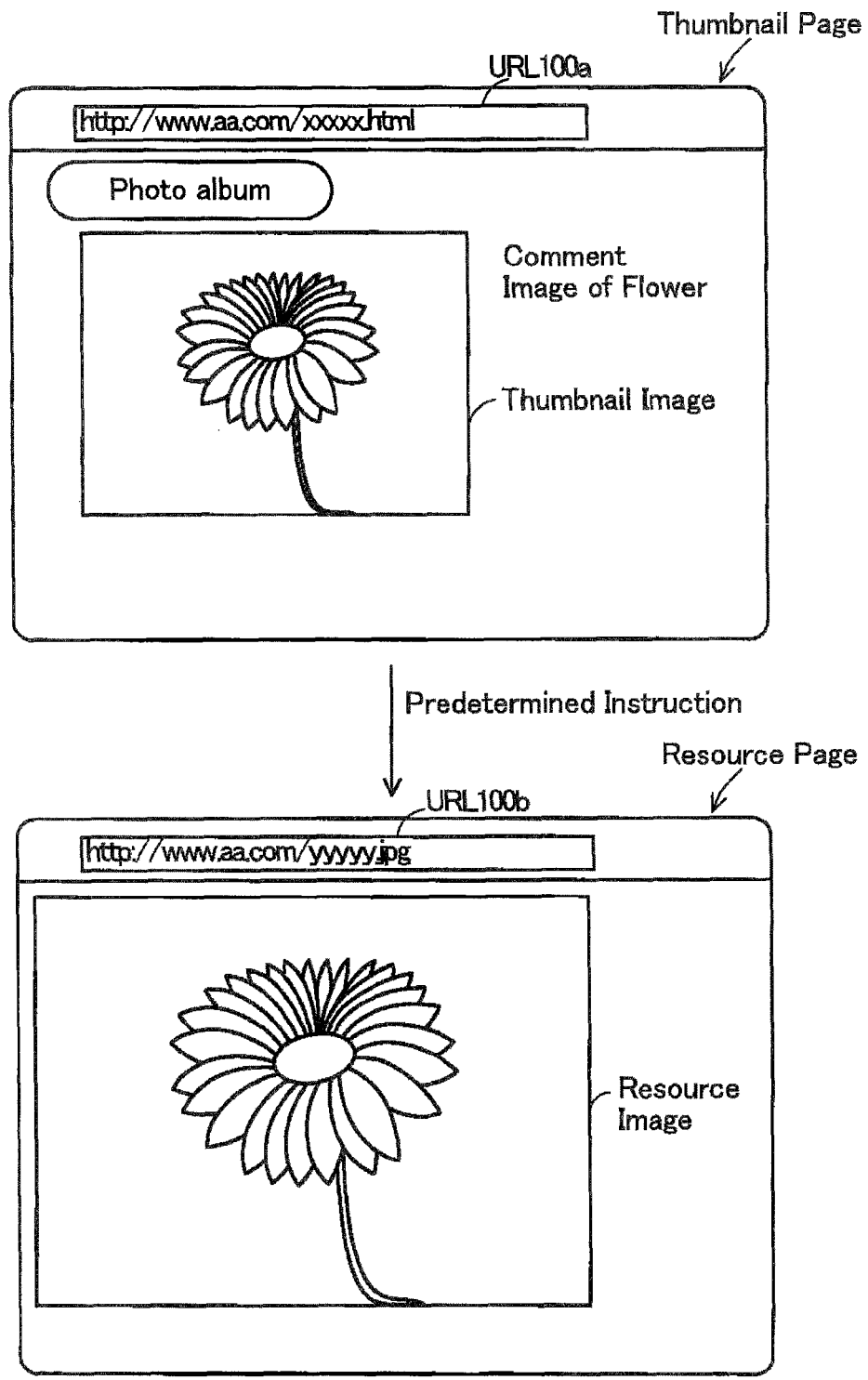
FIG. 2 shows an example of a web page displayed on a portable terminal.

The service providing server 100 not only saves the resource image file uploaded from the portable terminal 150, but also creates a thumbnail image file (e.g., a file representing a thumbnail image included in an upper diagram in FIG. 2) based on the resource image file, and saves the thumbnail image file.

When the resource image file and the thumbnail image file are saved in the service providing server 100, the target user, by using the portable terminal 150, can view a thumbnail page (see a web page shown in the upper diagram in FIG. 2) that includes the thumbnail image represented by the thumbnail image file, and can view a resource page (see a web page shown in the lower diagram in FIG. 2) that includes the resource image represented by the resource image file. Specifically, the target user first performs an operation on the portable terminal 150 for activating the web browser, and logs into the service providing server 100. Next, the target user performs an operation on the portable terminal 150 for viewing the thumbnail page (e.g., an operation of selecting a predetermined album from a list of albums, an operation of selecting a predetermined thumbnail image from a list of thumbnail images included in the album, etc.). In this case, as shown in FIG. 3, the web browser sends, by using the Wi-Fi communication, a thumbnail demanding command 200 of HTTP (an abbreviation of Hyper Text Transfer Protocol) to the service providing server 100. The thumbnail demanding command 200 includes a URL 100a as a destination URL. The URL 100a indicates a location of thumbnail data 202 representing the thumbnail page. The thumbnail data 202 is HTML (an abbreviation of Hyper Text Markup Language) format data representing the thumbnail page.

Upon receiving the thumbnail demanding command 200 from the portable terminal 150, the service providing server 100 sends the thumbnail data 202 to the portable terminal 150 according to the destination URL 100a included in the thumbnail demanding command 200.

The web browser of the portable terminal 150 receives the thumbnail data 202 by using the Wi-Fi communication. Thereby, the web browser can cause a display unit (not shown) of the portable terminal 150 to display the thumbnail page represented by the thumbnail data 202.

The upper diagram in FIG. 2 shows an example of the thumbnail page displayed on the portable terminal 150. The thumbnail page includes the URL 100a, the thumbnail image (an image of a flower in FIG. 2), and a text indicating various types of information (e.g., title "photo album", comment "image of flower", etc.). The URL 100a includes a server name "www.aa.com" of the service providing server 100. This means that the thumbnail data 202 is being provided from the service providing server 100. A character string "xxxxx" included in the URL 100a includes an ID for specifying the thumbnail image file. Further, as is clear from an extension included in the URL 100a being ".html", the thumbnail data 202 is HTML format data.

In case of wishing to see a resource image larger than the thumbnail image, the target user performs a predetermined operation (e.g., an operation of clicking on the thumbnail image) on the portable terminal 150 while the thumbnail page is in a state of being displayed. In this case, although not shown in FIG. 3, the web browser sends an image demanding command to the service providing server 100, for demanding the service providing server 100 to send the resource image file, and receives the resource image file from the service providing server 100. Thereby, the web browser can cause the display unit of the portable terminal 150 to display the resource page including the resource image.

The lower diagram in FIG. 2 shows an example of a resource page displayed on the portable terminal 150. The resource page includes a URL 100b of the resource image file, and a resource image. The URL 100b includes the server name "www.aa.com" of the service providing server 100. A character string "yyyyy" included in the URL 100b includes ID for specifying the resource image file. Further, as is clear from an extension included in the URL 100b being ".jpeg", the resource image file is JPEG format data. Thus, in the present embodiment, a data format (i.e., HTML format) of the thumbnail data 202, and a data format (i.e., JPEG format) of the resource image file are different. The resource image represents the same object (i.e., the flower) as the thumbnail image, but has a larger size than the thumbnail image. That is, a number of pixels of the resource image is greater than a number of pixels of the thumbnail image.

While the thumbnail page is in a state of being displayed on the portable terminal 150, the target user may wish to cause the MFP 10 to print the thumbnail image (i.e., the image of the flower) included in the thumbnail page. In this case, the target user brings the portable terminal 150 closer to the MFP 10 so that an NFC connection is established between the portable terminal 150 and the MFP 10. While a power source of the MFP 10 is ON, the NFC I/F 16 of the MFP 10 sends detecting radio waves for detecting an apparatus capable of executing the NFC communication (e.g., the portable terminal 150). Further, an NFC I/F (not shown) of the portable terminal 150 also sends detecting radio waves for detecting an apparatus capable of executing the NFC communication (e.g., the MFP 10). If a distance between the MFP 10 and the portable terminal 150 becomes smaller than a distance that the detecting radio waves reach (e.g., 10 cm), one apparatus of the MFP 10 and the portable terminal 150 receives the detecting radio waves from the other apparatus, and sends response radio waves. Consequently, the NFC connection is established between the MFP 10 and the portable terminal 150.

Next, by using the NFC communication (i.e., by using the NFC connection), the OS program of the portable terminal 150 sends the URL 100a of the thumbnail page currently being displayed on the portable terminal 150 to the MFP 10. This type of mechanism is a mechanism installed in advance in the OS program. That is, in case the web browser is operating as a foreground program, the OS program has a mechanism which, when an NFC connection is to be established, sends a URL of a web page being displayed by the web browser (i.e., the URL 100a in the present embodiment) by the NFC communication.

A receiving unit 41 of the MFP 10 receives the URL 100a by using the NFC communication (i.e., via the NFC I/F 16). In this case, the controller 30 of the MFP 10 sends a URL notification 204 of HTTP to the intermediation server 50 via the network I/F 22. The URL notification 204 includes the URL 100a. Moreover, the memory 34 stores, in advance, information (e.g., a URL of the intermediation server 50) for sending data to the intermediation server 50. Consequently, the controller 30 can send the URL notification 204 to the intermediation server 50 by using this information.

As described above, since the MFP 10 does not comprise the first API, the MFP 10 cannot create an image demanding command 206 (to be described) by using the first API. That is, due to not comprising the first API, the MFP 10 cannot acquire the URL 100b of the resource image file even if the MFP 10 receives the URL 100a of the thumbnail data 202. Consequently, in the present embodiment, the MFP 10 sends the URL notification 204 including the URL 100a to the intermediation server 50. Thereby, even without comprising the first API, the MFP 10 can acquire the URL 100b of the resource image file via the intermediation server 50 (see HTTP template 210 of FIG. 3, HTTP template 232 of FIG. 4; to be described). Consequently, the MFP 10 can acquire the resource image file appropriately.

A receiving unit 81 of the intermediation server 50 receives the URL notification 204 including the URL 100a from the MFP 10. Thereby, the receiving unit 81 can receive the URL 100a from the portable terminal 150 via the MFP 10.

Next, by using the URL 100a included in the URL notification 204, a selection unit 82 of the intermediation server 50 selects, from the plurality of service providing servers 100, 110, the service providing server 100 which sent the thumbnail data 202 to the portable terminal 150. Specifically, the selection unit 82 executes the following process.

The memory 74 of the intermediation server 50 stores the service table. The following are associated in the service table for each of the plurality of service providing servers 100, 110: the server name of the service providing server, and the service name corresponding to the service providing server. For example, for the service providing server 100, the server name "www.aa.com" and the service name "AAA" are associated and, further, for the service providing server 110, the server name "www.bb.com" and the service name "BBB" are associated. The service table is stored in advance in the memory 74 of the intermediation server 50 by a vendor of the MFP 10 (i.e., an administrator of the intermediation server 50).

The selection unit 82 first extracts the server name "www.aa.com" by extracting a character string described before the first slash "I" within the character string after "http://" included in the URL 100*a*. Referring to the service table within the memory 74, the selection unit 82 acquires the service name "AAA" associated with the extracted server name "www.aa.com". Thereby, the selection unit 82 can select the service providing server 100 (i.e., the service name "AAA") from the plurality of service providing servers 100, 110.

Next, a command communication unit 86 of the intermediation server 50 creates an image demanding command 206 by using the URL 100*a* and the first API corresponding to the selected service providing server 100. The image demanding command 206 is an HTTP command for demanding the service providing server 100 to send the URL 100*b* of the resource image file (see the lower diagram in FIG. 2). Specifically, the command communication unit 86 executes the following process according to the first API (i.e., program). That is, the command communication unit 86 extracts the character string "xxxxx" from the URL 100*a*. As described above, the character string "xxxxx" includes an ID (called "specific ID" below) for specifying the thumbnail image file. Next, the command communication unit 86 extracts the specific ID within the character string "xxxxx", and creates the image demanding command 206 including the specific ID. The image demanding command 206 includes the URL 100*a* as the destination URL.

Known service providing servers (e.g., 100, 110) include a server (called "compliant server" below) that corresponds to a public command, this being a command not including an AT (i.e., authentication information), and a server (called "non-compliant server" below) that does not correspond to a public command. Upon receiving the public command, the compliant server sends an OK response (e.g., a response including requested information) in response to the public command. By contrast, upon receiving the public command, the non-compliant server sends an NG response (e.g., a response not including requested information).

Consequently, normally when communicating with a service providing server, a communication apparatus (e.g., the portable terminal 150) sends an HTTP command including an AT to the service providing server so as to not receive the NG response. For example, the portable terminal 150 acquires the AT from the service providing server 100, and sends the thumbnail demanding command 200 including the AT to the service providing server 100. Consequently, the portable terminal 150 can appropriately receive the thumbnail data 202 (i.e., the OK response) from the service providing server 100.

However, the intermediation server 50 does not have an AT for receiving a service from the service providing server 100. Consequently, in order for the intermediation server 50 to send the image demanding command 206 including the AT to the service providing server 100, the intermediation server 50 must acquire the AT from the MFP 10. However, for this purpose, the communication of various information must be executed between the intermediation server 50 and the MFP 10 (e.g., the communication of information 220, 222, 224, 226 shown in FIG. 4), and consequently a communication load between the intermediation server 50 and the MFP 10 becomes large.

Accordingly, in the present embodiment, in view of the possibility that the service providing server 100 is the compliant server which corresponds to the public command, the intermediation server 50 first attempts communication with the service providing server 100 by using the public command not including the AT. If the service providing server 100 is the compliant server, as will be described later (see a case of YES in S12, to be described), the intermediation server 50 can cause the MFP 10 to execute a print of an image (i.e., the image of the flower) included in the thumbnail page even without executing the communication of various information between the intermediation server 50 and the MFP 10.

The command communication unit 86 creates the image demanding command 206 which is the public command not including the AT. Thereupon, the command communication unit 86 sends the image demanding command 206 to the service providing server 100.

Upon receiving the image demanding command 206, the service providing server 100 sends an HTTP response 208 to the intermediation server 50. In case the service providing server 100 is the compliant server, the service providing server 100 specifies the URL 100*b* of the resource image file based on the specific ID included in the image demanding command 206, and sends the response 208 that includes the URL 100*b* (i.e., an OK response) to the intermediation server 50. On the other hand, in case the service providing server 100 is the non-compliant server, the service providing server 100 sends the response 208 not including the URL 100*b* (i.e., the NG response) to the intermediation server 50.

The command communication unit 86 of the intermediation server 50 receives the response 208 from the service providing server 100. Next, in S12, a first determination unit 87 of the intermediation server 50 determines whether the service providing server 100 is the compliant server or the non-compliant server based on the response 208. Specifically, the first determination unit 87 determines that the service providing server 100 is the compliant server (i.e., YES in S12) in a case where the URL 100*b* is included in the response 208, and determines that the service providing server 100 is the non-compliant server (i.e., NO in S12) in a case where the URL 100*b* is not included in the response 208.

(Case where Service Providing Server 100 is Compliant Server (YES in S12))

As will be described later, in case NO is determined in S12, a display control unit 83 of the intermediation server 50 proceeds to FIG. 4 (to be described), and causes an account selection screen to be displayed on the display unit 14 of the MFP 10. By contrast, in case YES is determined in S12, the display control unit 83 does not cause the account selection screen to be displayed on the display unit 14 of the MFP 10. Thus, the intermediation server 50 can appropriately change whether or not to display the account selection screen in response to the determination result of S12.

In case YES is determined in S12, a specific process execution unit 89 of the intermediation server 50 creates an HTTP template 210. The HTTP template 210 is data in which commands, etc. relating to HTTP are described, and is data for the MFP 10 to create an image demanding command 212 (to be described) and send the image demanding command 212 to the service providing server 100.

Specifically, the specific process execution unit 89 creates the HTTP template 210 such that the destination URL of the image demanding command 212 matches the URL 100b included in the response 208 (i.e., the URL of the resource image file). That is, the HTTP template 210 includes the URL 100b. Further, the specific process execution unit 89 creates the HTTP template 210 that includes a print instruction for instructing the MFP 10 to execute a print. As described above, since it has been confirmed that the service providing server 100 is the compliant server (i.e., because S12 is YES), the HTTP template 210 does not include an AT. The specific process execution unit 89 sends the HTTP template 210 to the MFP 10.

The controller 30 of the MFP 10 receives the HTTP template 210 from the intermediation server 50. In this case, the controller 30 interprets the print instruction included in the HTTP template 210, and recognizes that the print is to be executed. Then, the controller 30 creates the image demanding command 212 by using the HTTP template 210. Specifically, the controller 30 creates the image demanding command 212 that includes, as the destination URL, the URL 100b included in the HTTP template 210. The image demanding command 212 is an HTTP command that can be created without using the first API. That is, the image demanding command 212 is a command that can be created by the MFP 10 which does not comprise the first API. On this point, the image demanding command 212 differs from the image demanding command 206. The controller 30 sends the image demanding command 212 to the service providing server 100.

Upon receiving the image demanding command 212 from the MFP 10, the service providing server 100 sends, to the MFP 10, a resource image file 240 (i.e., the JPEG file representing the resource image of the lower diagram in FIG. 2) according to the destination URL 100b included in the image demanding command 212.

The controller 30 of the MFP 10 receives the resource image file 240 from the service providing server 100. In this case, the controller 30 converts the JPEG format resource image file 240 into data having a format that can be interpreted by the print execution unit 18. For example, the controller 30 converts the resource image file 240, which is RGB multi-gradation (e.g., 256 gradations) data, into CMYK multi-gradation (e.g., 256 gradations) data, and then converts the CMYK multi-gradation data into CMYK binary (e.g., dot ON or OFF) data. Thereupon, the controller 30 supplies the CMYK binary data to the print execution unit 18. Consequently, the print execution unit 18 prints the resource image (i.e., the image of the flower) represented by the resource image file 240 onto a print medium. Thereby, the target user can acquire the printed print medium.

Moreover, as described above, a configuration was adopted in the present embodiment in which the intermediation server 50 sends the HTTP template 210 to the MFP 10 and, by using the HTTP template 210, the MFP 10 can receive the resource image file 240 from the service providing server 100 not via the intermediation server 50. Instead, adoption could be considered of a configuration in which the intermediation server 50 does not send the HTTP template 210 to the MFP 10, i.e., a configuration in which the intermediation server 50 receives the resource image file 240 from the service providing server 100, and sends the resource image file 240 to the MFP 10. However, if such a configuration is adopted, the target user could feel uncomfortable about the resource image file 240 representing a private image of the target user passing via the intermediation server 50. In view of this possibility, a configuration is adopted in the present embodiment in which the resource image file 240 does not pass via the intermediation server 50, i.e., a configuration in which the intermediation server 50 sends the HTTP template 210 to the MFP 10.

(Case where Service Providing Server 100 is Non-Compliant Server (NO in S12))

On the other hand, in case NO is determined in S12, the service providing server 100 is the non-compliant server that does not correspond to the public command. In such a situation, in order to receive the OK response from the service providing server 100, the intermediation server 50 must send an HTTP command including an AT capable of receiving a service from the service providing server 100. Accordingly, the intermediation server 50 executes the following processes shown in FIG. 4, and acquires the AT from the MFP 10. A first acquisition unit 84 of the intermediation server 50 first sends a user information sending command 220 to the MFP 10.

The controller 30 of the MFP 10 receives the user information sending command 220 from the intermediation server 50. In this case, the controller 30 sends, to the intermediation server 50, a list 222 (a list of four items of user information in the example of FIG. 4) of the plurality of user information (i.e., all the user information) that is stored in the memory 34. As shown in the list 222, in the present embodiment the plurality of user information includes two items of user information (i.e., "Alice-AAA-GGG", "Catherine-AAA-III") being capable of receiving a service from the service providing server 100, and two items of user information (i.e., "Bob-BBB-HHH", "David-CCC-JJJ") being capable of receiving a service from a service providing server (e.g., the service providing server 110) different from the service providing server 100.

The first acquisition unit 84 of the intermediation server 50 acquires the plurality of user information by receiving the list 222 from the MFP 10. As described above, in the process of FIG. 3, the selection unit 82 of the intermediation server 50 selected the service name "AAA" of the service providing server 100. The display control unit 83 of the intermediation server 50 extracts, from the plurality of user information included in the list 222, one or more items of user information 224 that include the selected service name "AAA" (in the example of FIG. 4, two items of user information (i.e., "Alice-AAA-GGG", "Catherine-AAA-III")). Next, the display control unit 83 supplies (i.e., sends) the extracted one or more items of user information 224 to the MFP 10. Thus, by executing the extraction and supply of the user information 224, the intermediation server 50 can appropriately cause the account selection screen (to be described) to be displayed in the display unit 14 of the MFP 10.

When supplying the extracted one or more items of user information 224 to the MFP 10, the display control unit 83 further supplies the MFP 10 with a command (called "sending command" below) which instructs the sending of an AT corresponding to account information selected from the account selection screen. For example, the display control unit 83 supplies the MFP 10 with the sending command which instructs the sending of an AT "GGG" corresponding to the account information "Alice-AAA", and the sending command which instructs the sending of an AT "III" corresponding to the account information "Catherine-AAA".

The controller 30 of the MFP 10 receives the one or more items of user information 224 and the sending command from the intermediation server 50. In this case, a display control unit 43 of the MFP 10 writes one or more items of account information (i.e., the display name and the service name) included in the one or more items of user information 224 into a template for display that is stored in advance in the memory 34, and creates data for display that represents the account selection screen. Then, the display control unit 43 supplies the created data for display to the display unit 14. Thereby, the display unit 14 displays the account selection screen.

As shown in FIG. 4, two items of account information (i.e., "Alice-AAA", "Catherine-AAA") including the service name "AAA" of the service providing server 100 are described in the account selection screen, and two items of account information (i.e., "Bob-BBB", "David-CCC") including the service name of another service providing server (e.g., the service name "BBB" of the service providing server 110) are not described in the account selection screen. That is, in the account selection screen, of the four items of account information stored in the memory 34, the two items of account information capable of receiving the service from the service providing server 100 are distinguished from the other two items of account information. Consequently, the target user can appropriately select, from the account selection screen displayed on the display unit 14, account information being capable of receiving the service from the service providing server 100.

The target user operates the operating unit 12 and selects, from the account selection screen, account information (e.g., "Alice-AAA") that includes the display name of the target user. In this case, the controller 30 sends an AT 226 (e.g., "GGG") corresponding to the selected account information to the intermediation server 50 according to the sending command.

A second acquisition unit 85 of the intermediation server 50 acquires the AT 226 by receiving the AT 226 from the MFP 10. In this case, the command communication unit 86 of the intermediation server 50 creates an image demanding command 228 by using the URL 100a and the first API that corresponds to the service providing server 100. A method of creating the image demanding command 228 is the same as the method of creating the image demanding command 206 of FIG. 3. However, the image demanding command 228 includes the AT 226. That is, the image demanding command 228 is not the public command. On this point, the image demanding command 228 differs from the image demanding command 206 of FIG. 3. Thereupon, the command communication unit 86 sends the image demanding command 228 to the service providing server 100.

Upon receiving the image demanding command 228, the service providing server 100 sends an HTTP response 230 to the intermediation server 50. Specifically, the service providing server 100 first executes authentication by using the AT 226 included in the image demanding command 228. If the target user selects appropriate account information from the account selection screen, the authentication usually succeeds. Consequently, based on the specific ID (i.e., ID for specifying the thumbnail image file) included in the image demanding command 228, the service providing server 100 specifies the URL 100b of the resource image file, and sends the response 230 including the URL 100b to the intermediation server 50.

The command communication unit 86 of the intermediation server 50 receives the response 230 from the service providing server 100. In this case, the specific process execution unit 89 of the intermediation server 50 creates an HTTP template 232. The HTTP template 232 is a template for the MFP 10 to create an image demanding command 234 (to be described), and send the image demanding command 234 to the service providing server 100. A method of creating the HTTP template 232 is the same as the method of creating the HTTP template 210 of FIG. 3. However, the specific process execution unit 89 creates the HTTP template 232 such that the image demanding command 234 including the AT 226 is sent from the MFP 10 to the service providing server 100. That is, the HTTP template 232 includes the AT 226. On this point, the HTTP template 232 differs from the HTTP template 210 of FIG. 3. Thereupon, the specific process execution unit 89 sends the HTTP template 232 to the MFP 10.

A subsequent process is approximately the same as the process of FIG. 3, but differs in the following point. That is, by using the HTTP template 232, the controller 30 of the MFP 10 sends the image demanding command 234 including the AT 226 to the service providing server 100. Upon receiving the image demanding command 234, the service providing server 100 executes authentication by using the AT 226 included in the image demanding command 234. When the authentication succeeds, the service providing server 100 sends the resource image file 240 to the MFP 10. Consequently, the print execution unit 18 of the MFP 10 prints the resource image (i.e., the image of the flower) represented by the resource image file 240 onto a print medium. Thereby, the target user can acquire the printed print medium.

(Result of First Embodiment)

As shown in FIG. 3, the portable terminal 150 acquires the thumbnail data 202 from the service providing server 100, and causes the thumbnail page (see the upper diagram in FIG. 2) to be displayed. Thereupon, by bringing the portable terminal 150 closer to the MFP 10 while the thumbnail page is in a state of being displayed on the portable terminal 150, the target user can cause the MFP 10 to execute the print of the image (i.e., the image of the flower) included in the thumbnail page.

As shown in FIG. 3 and FIG. 4, the MFP 10 executes the print according to the resource image file 240 without executing the print according to the thumbnail data 202. As described above, the number of pixels of the resource image included in the resource image file 240 is greater than the number of pixels of the thumbnail image included in the thumbnail data 202. Consequently, if a configuration is adopted, as in the present embodiment, in which the MFP 10 executes the print according to the resource image file 240, a high-quality print result can be provided to the target user. Further, the target user usually does not wish to print the text such as the title "photo album", the comment "image of flower", etc. included in the thumbnail page, but wishes to print only the image (i.e., the image of the flower) included in the thumbnail page. According to the present embodiment, a desired print result can be provided to the target user. Further, usually the MFP 10 can interpret JPEG format data such as the resource image file 240 (i.e., can create CMYK binary data from the JPEG format data), but cannot interpret HTML format data such as the thumbnail data 202. According to the present embodiment, the intermediation server 50 can appropriately cause the MFP 10 to execute print by causing the MFP 10 to execute the print according to the resource image file 240, which is not the thumbnail data 202.

Moreover, as described above, the portable terminal 150 can acquire the resource image file 240 from the service providing server 100 by a predetermined operation being executed by the target user while the thumbnail page is in the state of being displayed. Consequently, adoption of a configuration (called "configuration of comparative example" below) can be considered in which the portable terminal 150 sends the acquired resource image file 240 to the MFP 10, and causes the MFP 10 to execute the print.

However, in order to adopt the configuration of the comparative example, the portable terminal 150 must comprise a particular application for creating a print instruction that instructs the MFP 10 to execute the print, and for sending the print instruction and the resource image file 240 to the MFP 10. For example, adoption of a configuration could be considered in which the resource image file 240 is sent by using the NFC communication. However, in order to adopt such a configuration, the portable terminal 150 must comprise the particular application for sending the print instruction and the resource image file 240 by using the NFC communication. Further, adoption of a configuration could be considered in which the resource image file 240 is sent by using the Wi-Fi communication. However, in order to adopt such a configuration, not only must the portable terminal 150 comprise the particular application for sending the print instruction and the resource image file 240 by using the Wi-Fi communication, but the MFP 10 and the portable terminal 150 must be present within the same network. Thus, in order to adopt the configuration of the comparative example, the target user must install the above particular application in the portable terminal 150. Further, in case of the portable terminal 150 sending the resource image file 240 to the MFP 10 by using the Wi-Fi communication, the target user must create an environment in which the MFP 10 and the portable terminal 150 are present within the same network.

According to the present embodiment, a situation is assumed in which the particular application is not installed in the portable terminal 150, and the MFP 10 and the portable terminal 150 are not present within the same network. In such a situation, the configuration of the comparative example cannot be adopted. However, in the present embodiment, as shown in FIG. 3 and FIG. 4, the MFP 10 can appropriately execute the print. Moreover, according to the present embodiment, even in a situation where the MFP 10 and the portable terminal 150 are present within the same network and the particular application is not installed in the portable terminal 150, the MFP 10 can appropriately be caused to execute print, as shown in FIG. 3 and FIG. 4.

Further, as shown in FIG. 3, in case of receiving the URL notification 204, the intermediation server 50 selects the service providing server 100 from among the plurality of service providing servers 100, 110 by using the URL 100a. Thereupon, as shown in FIG. 4, the intermediation server 50 causes the following to be displayed on the display unit 14 of the MFP 10: the two items of account information (i.e., "Alice-AAA", "Catherine-AAA") being capable of receiving the service from the selected service providing server 100 among all the account information (i.e., four items of account information) stored in the MFP 10. At this juncture, the other two items of account information ("Bob-BBB", "David-CCC") are not displayed on the display unit 14 of the MFP 10. Consequently, the target user can select the account information being capable of receiving the service from the service providing server 100 more easily than in a configuration which displays all the account information (i.e., four items of account information) that is stored in the MFP 10.

Further, as shown in FIG. 3, in case of receiving the URL notification 204, the intermediation server 50 sends the image demanding command 206, this being the public command, to the service providing server 100 by using the URL 100a. Thereupon, in case of receiving the response 208 including the URL 100b from the service providing server 100 (i.e., in case of YES in S12), the intermediation server 50 executes the process (i.e., creation and sending of the HTTP template 210) for causing the MFP 10 to execute the print according to the resource image file 240. Consequently, the intermediation server 50 can appropriately cause the MFP 10 to execute the print according to the resource image file 240 without acquiring the AT 226 for receiving the service from the service providing server 100 (i.e., without executing the various communications shown in FIG. 4 between the intermediation server 50 and the MFP 10).

(Corresponding Relationships)

The MFP 10, the portable terminal 150 and the service providing server 100 are respectively examples of the "data processing device", the "terminal device" and the "specific service providing server". The intermediation server 50 is an example of the "control server" and the "control device for the data processing device". The thumbnail data 202, the thumbnail image and the resource image file 240 are respectively examples of the "specific web page data", the "target image" and the "image file". The URL 100a and the URL 100b are respectively examples of the "first location information" and the "second location information". The selected account information and the AT 226 are respectively examples of the "specific account information" and the "specific authentication information". The four items of account information stored in the MFP 10, the two items of account information (i.e., "Alice-AAA", "Catherine-AAA") described in the account selection screen, and the two items of account information (i.e., "Bob-BBB", "David-CCC") not being described in the account selection screen are respectively examples of the "M items of account information", the "N items of account information", and the "(M-N) items of account information".

The image demanding command 228 and the response 230 are respectively examples of the "first type of command" and the "first type of response". Consequently, the process of sending the image demanding command 228 to the service providing server 100 and receiving the response 230 is an example of the process executed by the "first command communication unit". The image demanding command 206 (i.e., the public command) is an example of the "second type of command" and the "specific command". The response 208 is an example of the "second type of response" and the "specific response". Consequently, the process of sending the image demanding command 206 to the service providing server 100 and receiving the response 208 is an example of the process executed by the "second command communication unit" and the "command communication unit". The Wi-Fi communication and the NFC communication are respectively examples of the "first type of communication" and the "second type of communication". The process of creating the HTTP template 210 (or 232) and the process of sending the HTTP template 210 (or 232) is an example of the "specific process".

Second Embodiment

Next, a second embodiment will be described with reference to FIG. 5. In the present embodiment, the memory 74 of the intermediation server 50 stores a server table in addition to the service table. As shown in FIG. 5, the server table stores an association of the following for each of the plurality of service providing servers 100, 110: the service name (e.g., "AAA") of the service providing server, and information ("OK" or "NG") indicating whether the service providing server is the compliant server. "OK" indicates that the service providing server is the compliant server, i.e., that the service providing server is capable of sending the OK response in response to the public command. "NG" indicates that the service providing server is the non-compliant server, i.e., that the service providing server is a server which sends the NG response in response to the public command. The vendor of the MFP 10 investigates whether the various known service providing servers 100, 110 are compliant servers, and stores, in advance, the server table based on the results of the investigation in the memory 74 of the intermediation server 50.

Processes until the intermediation server 50 selects the service providing server 100 are the same as those of FIG. 3 of the first embodiment. In S11, a second determination unit 88 of the intermediation server 50 determines, based on the server table within the memory 74, whether the selected service providing server 100 is the compliant server. In the example of FIG. 5, "OK" is associated with the service name "AAA" corresponding to the selected service providing server 100 in the server table. Consequently, the second determination unit 88 determines that the selected service providing server 100 is the compliant server (i.e., YES in S11). However, in a case where "NG" is associated with the service name "AAA" in the server table, the second determination unit 88 determines that the selected service providing server 100 is the non-compliant server (i.e., NO in S11).

In case of determining that the selected service providing server 100 is the compliant server (i.e., in case of YES in S11), the communication of the image demanding command 206 and the response 208 is executed, and the determination of S12 is executed, as with FIG. 3. Since the selected service providing server 100 is the compliant server, YES is usually determined in S12. However, in case e.g., the service providing server 100 changed from the compliant server to the non-compliant server after the aforementioned investigation by the vendor of the MFP 10, the response 208 is the NG response not including the URL 100b. In view of this possibility, the intermediation server 50 executes the determination of S12 even in the case where YES is determined in S11.

In case of YES in S12, as with FIG. 3, the communication of the HTTP template 210, the image demanding command 212, and the resource image file 240 is executed, and then the print process is executed. Further, in case of NO in S11, or in case of NO in S12, the process proceeds to FIG. 4. The processes of FIG. 4 are the same as those of the first embodiment.

According to the present embodiment, in the case of NO in S11, i.e., in case of determining, based on the server table, that the service providing server 100 is the non-compliant server, the command communication unit 86 of the intermediation server 50 does not send the image demanding command 206, which is the public command, to the service providing server 100. Thereby, it is possible to prevent the sending of the public command to the non-compliant server which does not correspond to the public command. Consequently, the communication load between the intermediation server 50 and the service providing server 100 can be reduced.

Third Embodiment

Next, a third embodiment will be described with reference to FIG. 6. In the present embodiment, in the case of NO in S12 of FIG. 3, i.e., in case the service providing server 100 is the non-compliant server, processes of FIG. 6 are executed instead of the processes of FIG. 4. In the first and second embodiments, as shown in FIG. 4, the intermediation server 50 extracts the user information 224 corresponding to the selected service providing server 100, and supplies the user information 224 to the MFP 10. By contrast, in the present embodiment, the extraction process is executed not by the intermediation server 50, but by the MFP 10.

The display control unit 83 of the intermediation server 50 supplies (i.e., sends) server information 250 indicating the selected service providing server 100, i.e., the server information 250 including the selected service name "AAA", to the MFP 10.

The controller 30 of the MFP 10 receives the server information from the intermediation server 50. In this case, the display control unit 43 of the MFP 10 extracts the user information 224 by using a method that is the same as the method for extracting the user information 224 used by the display control unit 83 of the intermediation server 50 of the first embodiment (see FIG. 4). Thereupon, by using a method that is the same as that of the first embodiment, the display control unit 43 causes the display unit 14 to display the account selection screen by using the user information 224. Subsequent processes are the same as those of the first embodiment.

According to the present embodiment, by supplying the MFP 10 with the server information 250 indicating the service providing server 100, the intermediation server 50 can appropriately cause the MFP 10 to execute the process of extracting the user information 224, and the process of causing the display unit 14 to display the account information (i.e., "Alice-AAA", "Catherine-AAA") included in the user information 224. In the present embodiment, also, as with the first and second embodiments, the intermediation server 50 can cause appropriate account information to be displayed on the display unit 14 of the MFP 10. In particular, in the present embodiment, the communication of the list 222 and the user information 224 (see FIG. 4) is not executed between the MFP 10 and the intermediation server 50. Consequently, the communication load between the MFP 10 and the intermediation server 50 can be reduced.

Fourth Embodiment

Next, a fourth embodiment will be described with reference to FIG. 7 and FIG. 8. In the first to third embodiments, the intermediation server 50 is provided because the MFP 10 does not comprise APIs corresponding to the service providing servers 100, 110. By contrast, in the present embodiment, the MFP 10 comprises APIs corresponding to the service providing servers 100, 110, and the intermediation server 50 is not provided. Further, in the present embodiment, the memory 34 of the MFP 10 stores the service table.

Processes until sending the URL 100a to the MFP 10 from the portable terminal 150 are the same as those of FIG. 3 of the first embodiment. The receiving unit 41 of the MFP 10 receives the URL 100a from the portable terminal 150 via the NFC I/F 16 (i.e., by using an NFC communication). In this case, by using a method that is the same as that of the selection unit 82 of the intermediation server 50 of the first embodiment, a selection unit 42 of the MFP 10 refers to the service table within the memory 34, and selects the service providing server 100 from the plurality of service providing servers 100, 110.

Next, a command communication unit 46 of the MFP 10 creates an image demanding command 306 by using the URL 100a and the first API corresponding to the selected service providing server 100. A method by which the command communication unit 46 creates the image demanding command 306 is the same as the method by which the command communication unit 86 of the intermediation server 50 of the first embodiment creates the image demanding command 206 (see FIG. 3). That is, the image demanding command 306 is the public command not including the AT. Due to comprising the first API, the MFP 10 can appropriately create the image demanding command 306. The command communication unit 46 sends the image demanding command 306 to the service providing server 100, and receives a response 308.

Next, in S42, a first determination unit 47 of the MFP 10 determines whether the service providing server 100 is the compliant server based on the response 308. A determination method of S42 is the same as the determination method of S12 of FIG. 3 of the first embodiment.

In case YES is determined in S42, i.e., in case the service providing server 100 is the compliant server, a specific process execution unit 49 of the MFP 10 creates an image demanding command 312, and sends the image demanding command 312 to the service providing server 100. As with the image demanding command 212 of FIG. 3, the image demanding command 312 is an HTTP command which can be created without using the first API. A destination URL of the image demanding command 312 is the URL 100b included in the response 308 (i.e., an URL of the resource image file 240). Further, the image demanding command 312 is the public command not including the AT.

Upon receiving the image demanding command 312 from the MFP 10, the service providing server 100 sends the resource image file 240 to the MFP 10 according to the destination URL 100b included in the image demanding command 312.

The specific process execution unit 49 of the MFP 10 receives the resource image file 240 from the service providing server 100. In this case, the specific process execution unit 49 converts the resource image file 240 into CMYK binary data, and supplies the data to the print execution unit 18. Thereby, the print process is executed.

On the other hand, in case NO is determined in S42, as shown in FIG. 8, the display control unit 43 of the MFP 10 extracts, from the plurality of user information stored in the memory 34, the one or more items of user information (i.e., "Alice-AAA-GGG", "Catherine-AAA-III") that include the selected service name "AAA". Next, the display control unit 43 describes the one or more items of account information (i.e., "Alice-AAA", "Catherine-AAA") included in the extracted one or more items of user information in the template for display stored in advance in the memory 34. Then, the display control unit 43 causes the display unit 14 to display the account selection screen.

In a case where account information (e.g., "Alice-AAA") is selected from the account selection screen, a second acquisition unit 45 of the MFP 10 acquires an AT 326 by identifying, from the memory 34, the AT 326 (e.g., "GGG") associated with the selected account information. Next, the command communication unit 46 of the MFP 10 creates an image demanding command 328 including the AT 326 by using the URL 100a and the first API corresponding to the service providing server 100. A method of creating the image demanding command 328 is the same as the method of creating the image demanding command 228 of FIG. 4. Due to comprising the first API, the MFP 10 can appropriately create the image demanding command 328. Thereupon, the command communication unit 46 sends the image demanding command 328 to the service providing server 100.

Upon receiving the image demanding command 328, the service providing server 100 usually succeeds in authentication, and sends a response 330 including the URL 100b to the MFP 10.

The command communication unit 46 of the MFP 10 receives the response 330 from the service providing server 100. In this case, the specific process execution unit 49 of the MFP 10 creates an image demanding command 334. As with the image demanding command 234 of FIG. 4, the image demanding command 334 is an HTTP command which can be created without using the first API. A destination URL of the image demanding command 334 is the URL 100b included in the response 330. Further, the image demanding command 334 includes the AT 326.

Subsequent processes are approximately the same as the processes of FIG. 7. That is, the controller 30 of the MFP 10 sends the image demanding command 334 including the AT 326 to the service providing server 100. Upon receiving the image demanding command 334, the service providing server 100 executes authentication by using the AT 326 included in the image demanding command 334. When the authentication succeeds, the service providing server 100 sends the resource image file 240 to the MFP 10. Consequently, the print execution unit 18 of the MFP 10 prints, onto a print medium, the resource image (i.e., the image of the flower) represented by the resource image file 240. Thereby, the target user can acquire the printed print medium.

In the present embodiment, also, the same results as the first embodiment can be obtained. In particular, not providing the intermediation server 50 allows the configuration of the communication system 2 to be simplified. Moreover, the memory 34 of the MFP 10 may further store the server table (see FIG. 5) of the second embodiment. In this case, after the service providing server 100 has been selected from the plurality of service providing servers 100, 110, a second determination unit 48 of the MFP 10 may determine whether or not the service providing server 100 is the compliant server based on the server table, as with S11 of FIG. 5 of the second embodiment. Thereupon, the command communication unit 46 of the MFP 10 may send the image demanding command 306 to the service providing server 100 in a case where it is determined that the service providing server 100 is the compliant server, and may not send the image demanding command 306 to the service providing server 100 in a case where it is determined that the service providing server 100 is the non-compliant server (i.e., processes of FIG. 8 may be executed). According to this configuration, the same results as the second embodiment can be obtained.

(Corresponding Relationships)

In the present embodiment, the MFP 10 is an example of the "data processing device" and the controller 30 of the MFP 10 is an example of the "control device for the data processing device". Further, the image demanding command 328 and the response 330 are respectively examples of the "first type of command" and the "first type of response". Consequently, the process of: sending the image demanding command 328 to the service providing server 100; and receiving the response 330 is an example of the process executed by the "first command communication unit". The image demanding command 306 (i.e., the public command) is an example of the "second type of command" and the "specific command". The response 308 is an example of the "second type of response" and the "specific response". Consequently, the process of: sending the image demanding command 306 to the service providing server 100; and receiving the response 308 is an example of the process executed by the "second command communication unit" and the "command communication unit". The process of creating the image demanding command 312, the process of sending the image demanding command 312 and receiving the resource image file 240, the process of creating the CMYK binary data from the resource image file 240, and the process of supplying the data to the print execution unit 18 is an example of the "specific process".

(Variant 1)

In the above embodiments, a situation is assumed in which an NFC connection is established between the portable terminal 150 and the MFP 10 while the thumbnail page (see the upper diagram in FIG. 2) is in a state of being displayed on the portable terminal 150. That is, a situation is assumed in which the URL 100a of the thumbnail data 202 is sent from the portable terminal 150 to the MFP 10. However, an NFC connection may be established between the portable terminal 150 and the MFP 10 while the resource page (see the lower diagram in FIG. 2) is in a state of being displayed on the portable terminal 150. In this case, the URL 100*b* of the resource image file 240 is sent from the portable terminal 150 to the MFP 10.

In the present variant, the receiving unit 41 of the MFP 10 receives the URL 100*b* by using the NFC communication (i.e., via the NFC I/F 16). Thereupon, the receiving unit 81 of the intermediation server 50 receives the URL 100*b* via the MFP 10. In this case, as with the first to third embodiments, the selection unit 82 selects the service providing server 100. Thereupon, by using the URL 100*b* and the first API, the command communication unit 86 creates a specific image demanding command not including an AT. The specific image demanding command is a command for demanding the service providing server 100 to send the URL 100*b* of the resource image file 240. Specifically, the command communication unit 86 creates the specific image demanding command including an ID for specifying the resource image file 240, this ID being included in the URL 100*b*. Thereupon, the command communication unit 86 sends the specific image demanding command to the service providing server 100. Moreover, since having acquired the URL 100*b* from the MFP 10, the intermediation server 50 does not need to acquire the URL 100*b* from the service providing server 100. However, in order to determine whether the service providing server 100 is the compliant server or the non-compliant server, the intermediation server 50 sends the specific image demanding command to the service providing server 100.

In a case where the service providing server 100 is the compliant server, the service providing server 100 sends an OK response including the URL 100*b* to the intermediation server 50. On the other hand, in a case where the service providing server 100 is the non-compliant server, the service providing server 100 sends an NG response not including the URL 100*b* to the intermediation server 50.

The command communication unit 86 of the intermediation server 50 receives the response from the service providing server 100. Next, the first determination unit 87 of the intermediation server 50 determines that the service providing server 100 is the compliant server in a case where the URL 100*b* is included in the response, and determines that the service providing server 100 is the non-compliant server in a case where the URL 100*b* is not included in the response.

In the case where it is determined that the service providing server 100 is the compliant server, the specific process execution unit 89 of the intermediation server 50 creates an HTTP template including the URL 100*b* (however, this HTTP template does not include an AT). This HTTP template is the same as the template 210 of FIG. 3. Subsequent processes are the same as the processes of FIG. 3. On the other hand, in the case where it is determined that the service providing server 100 is the non-compliant server, processes which are the same as those of FIG. 4 are executed.

According to the present variant, also, the same results as the first embodiment, etc. can be obtained. In the present variant, the resource page including a resource image represented by the resource image file 240, and the URL 100*b*, are respectively examples of the "specific web page data" and the "first location information".

(Variant 2)
In the above embodiments, the display control unit 83 (or 43) causes the display unit 14 to display the account selection screen that includes the display name and the service name. That is, in the above embodiments, the display name and the service name are an example of the "account information". Instead, the display control unit 83 (or 43) may cause the display unit 14 to display an account selection screen that includes the display name, the service name, and the AT. In the present variant, the display name, the service name, and the AT are an example of the "account information". Further, in another variant, the display control unit 83 (or 43) may cause the display unit 14 to display an account selection screen that includes only the display name. In the present variant, the display name is an example of the "account information". Further, in another variant, the display control unit 83 (or 43) may cause the display unit 14 to display an account selection screen that includes account information other than the display name, the service name, etc. (e.g., an account name registered in the service providing server 100, user ID, mail address, etc.).

(Variant 3)
In the above embodiments, the display control unit 83 (or 43) causes the display unit 14 to display the two items of account information (i.e., "Alice-AAA", "Catherine-AAA") corresponding to the service providing server 100, among the four items of account information stored in the memory 34 of the MFP 10. That is, in the above embodiments, "M" is four, and "N" is two. However, the total number of items of account information stored in the memory 34 may be greater than four, or smaller than four. That is, "M" may be any integer which is two or more. Further, the number of items of account information corresponding to the service providing server 100 that are stored in the memory 34 may be greater than two, or smaller than two. That is, "N" may be any integer which is one or more and equal to M or less.

(Variant 4)
In the above embodiments, the display control unit 83 (or 43) causes the display unit 14 to display the two items of account information corresponding to the service providing server 100, among the four items of account information stored in the memory 34 of the MFP 10, and does not cause the display unit 14 to display the other two items of account information. That is, the display control unit 83 (or 43) causes the display unit 14 to display the former account information in a manner distinguishable from the latter account information. Instead, the display control unit 83 (or 43) may cause the display unit 14 to display the former account information in a first color (e.g., red), and to display the latter account information in a second color (e.g., black) that is different from the first color. In this case, (1) all the former account information and the latter account information may be displayed in a manner selectable by the user or, (2) the former account information may be displayed in a manner selectable by the user, and the latter account information may be displayed in a manner not selectable by the user (e.g., grayed out manner). The present variant also includes the configuration in which the "display the N items of account information among the M items of account information in a manner distinguishable from the (M-N) items of account information".

(Variant 5)
In the above embodiments, the display control unit 83 (or 43) causes the display unit 14 to display the account information corresponding to the service providing server 100, among all the account information stored in the memory 34 of the MFP 10, and does not cause the display unit 14 to display the account information corresponding to the other service providing server. Instead, the display control unit 83 (or 43) may cause the display unit 14 to display all the account information stored in the memory 34 of the MFP 10. That is, the user may be able to select at least the account information corresponding to the service providing server 100. In general terms, the display control unit 83 (or 43) may cause the display unit 14 to display at least N items of account information among M items of account information.

(Variant 6)

In the first to third embodiments, the specific process execution unit 89 of the intermediation server 50 creates the HTTP template 210 (or 232), and sends the HTTP template 210 (or 232) to the MFP 10. Instead, the specific process execution unit 89 may send the URL 100*b* and the print instruction to the MFP 10 without creating the HTTP template 210 (or 232). In case of receiving the URL 100*b* and the print instruction, the controller 30 of the MFP 10 may create the image demanding command 212 (or 234) including the URL 100*b* as the destination URL, and send the image demanding command 212 (or 234) to the service providing server 100. Since the image demanding command 212 (or 234) is an HTTP command which can be created without using the first API, the MFP 10 can create the image demanding command 212 (or 234) appropriately. In the present variant, the process of sending the URL 100*b* and the print instruction is an example of the "specific process".

(Variant 7)

The "authentication information" is not restricted to the access token, but may be other information (e.g., user ID, password, etc.) used in authentication of the service providing servers 100, 110.

(Variant 8)

The "first type of wireless communication" is not restricted to the Wi-Fi communication (i.e., HTTP communication), but may be e.g., a wireless communication such as 3G, etc. complying with the standards of IMT2000 (an abbreviation of International Mobile Telecommunication 2000). Further, instead of the HTTP communication, a communication may be utilized that is in accordance with another protocol for a communication of web data (e.g., HTTPS, etc. conforming to HTTP). Further, the "second type of wireless communication" is not restricted to the NFC communication, but may be e.g., an infrared communication, a Bluetooth (registered trademark) communication, transfer jet communication etc.

(Variant 9)

The "data processing device" is not restricted to the MFP 10, but may be a device such as a printer, scanner, PC, terminal device, etc.

(Variant 10)

In the above embodiments, functions of the units 41 to 49, 81 to 89 are realized by the CPUs 32, 72 of the MFP 10 and the intermediation server 50 executing processes according to software. Instead, at least a part of the functions of the units 41 to 49, 81 to 89 may be realized by hardware such as a logic circuit, etc.

What is claimed is:

1. A control server comprising:
a processor configured to perform:
receiving first location information indicating a location of specific web page data via a data processing device, in a case where a terminal device comprising a web browser receives the specific web page data from a specific service providing server by using a first type of wireless communication and sends the first location information to the data processing device by using a second type of wireless communication, the specific web page data representing a thumbnail image, the second type of wireless communication being a short distance wireless communication having a shorter wireless communication distance than the first type of wireless communication;
causing a display unit of the data processing device to display at least N items of account information among M items of account information currently stored in the data processing device, in a case where the first location information is received, the M being an integer of two or more, the N being an integer which is one or more and is equal to the M or less, each of the N items of account information being available for receiving a data providing service from the specific service providing server;
acquiring specific authentication information corresponding to specific account information from the data processing device, in a case where the specific account information is selected by a user from among the N items of account information displayed on the display unit;
sending a first type of command including the specific authentication information to the specific service providing server by using the first location information;
receiving a first type of response in response to the first type of command from the specific service providing server, the first type of response including second location information, the second location information indicating a location of an image file which represents a resource image, the resource image representing the same object as the thumbnail image, a number of pixels of the resource image being greater than a number of pixels of the thumbnail image; and
executing a specific process by using the second location information included in the first type of response, the specific process including a process of causing a print execution unit of the data processing device to execute a print according to the image file.

2. The control server as in claim 1, wherein
the M items of account information include the N items of account information and (M-N) items of account information being available for receiving a data providing service from one or more service providing servers which are different from the specific service providing server,
the processor is configured to further perform:
selecting, by using the first location information, the specific service providing server from among a plurality of service providing servers including the specific service providing server and the one or more service providing servers,
wherein the causing includes causing the display unit to display the N items of account information among the M items of account information in a manner distinguishable from the (M-N) items of account information.

3. The control server as in claim 2, wherein
the processor is configured to further perform:
acquiring the M items of account information from the data processing device,
wherein the causing includes extracting the N items of account information from among the M items of account information, and supplying the N items of account information to the data processing device, so as to cause the display unit to display the N items of account information among the M items of account information in the manner distinguishable from the (M-N) items of account information.

4. The control server as in claim 2, wherein
the causing includes supplying server information indicating the specific service providing server to the data processing device, so as to cause the data processing device to execute a process of extracting the N items account information from among the M items of account information and a process of displaying on the display unit the N items of account information in the manner distinguishable from the (M-N) items of account information.

5. The control server as in claim 1, wherein
the processor is configured to further perform:
sending a second type of command not including authentication information to the specific service providing server by using the first location information;
receiving a second type of response in response to the second type of command from the specific service providing server; and
determining, based on the second type of response, whether the specific service providing server is capable of executing a data providing service in response to the second type of command,
wherein the causing includes:
causing the display unit to display the at least N items of account information among the M items of account information, in a case where it is determined that the specific service providing server is not capable of executing the data providing service in response to the second type of command; and
causing the display unit not to display any account information included in the M items of account information, in a case where it is determined that the specific service providing server is capable of executing the data providing service in response to the second type of command.

6. The control server as in claim 5, further comprising:
a memory configured to store, for each of a plurality of service providing servers including the specific service providing server and one or more service providing servers which are different from the specific service providing server, information indicating whether the each service providing server is capable of executing a data providing service in response to the second type of command,
wherein the processor is configured to further perform:
determining, based on contents within the memory, whether the specific service providing server is capable of executing a data providing service in response to the second type of command,
wherein the processor is configured to perform the sending of the second type of command to the specific service providing server, in a case where it is determined that the specific service providing server is capable of executing the data providing service in response to the second type of command, and
the processor is configured not to perform the sending of the second type of command to the specific service providing server, in a case where it is determined that the specific service providing server is not capable of executing the data providing service in response to the second type of command.

7. The control server as in claim 5, wherein
the determining includes:
determining that the specific service providing server is capable of executing the data providing service in response to the second type of command, in a case where the first type of response includes second location information indicating a location of an image file corresponding to a target image represented by the specific web page data; and
determining that the specific service providing server is not capable of executing the data providing service in response to the second type of command, in a case where the first type of response does not include the second location information.

8. A control device for a data processing device configured separately from the control device, the control device comprising:
a processor configured to perform:
receiving first location information indicating a location of specific web page data via the data processing device, in a case where a terminal device comprising a web browser receives the specific web page data from a specific service providing server by using a first type of wireless communication and sends the first location information to the data processing device by using a second type of wireless communication, the second type of wireless communication being a short distance wireless communication having a shorter wireless communication distance than the first type of wireless communication, the specific web page data representing a thumbnail image;
sending a specific command not including authentication information to the specific service providing server by using the first location information;
receiving a specific response including second location information indicating a location of an image file which represents a resource image from the specific service providing server, the specific response being a response which is sent from the specific service providing server in a case where the specific service providing server is capable of executing a data providing service in response to the specific command, the resource image representing the same object as the thumbnail image, a number of pixels of the resource image being greater than a number of pixels of the thumbnail image; and
executing a specific process in a case where the specific response is received,
wherein the specific process includes:
a process of generating a template for the data processing device to acquire the image file from the specific service providing server, the template including the second location information and a print instruction for instructing the data processing device to execute a print according to the image file;
a process of sending the template to the data processing device; and
a process of causing a print execution unit of the data processing device to execute the print according to the image file.

9. A non-transitory computer-readable medium storing computer-readable instructions for a control server,
wherein the computer-readable instructions, when executed by a processor of the control server, cause the control server to perform:
receiving first location information indicating a location of specific web page data via a data processing device, in a case where a terminal device comprising a web browser receives the specific web page data from a specific service providing server by using a first type of wireless communication and sends the first location information to the data processing device by using a second type of wireless communication, the specific web page data representing a thumbnail image, the second type of wireless communication being a short distance wireless communication having a shorter wireless communication distance than the first type of wireless communication;
causing a display unit of the data processing device to display at least N items of account information among M items of account information currently stored in the data processing device, in a case where the first location information is received, the M being an integer of two or more, the N being an integer which is one or more and is equal to the M or less, each of the N items of account information being available for receiving a data providing service from the specific service providing server;

acquiring specific authentication information corresponding to specific account information from the data processing device, in a case where the specific account information is selected by a user from among the N items of account information displayed on the display unit;

sending a first type of command including the specific authentication information to the specific service providing server by using the first location information;

receiving a first type of response in response to the first type of command from the specific service providing server, the first type of response including second location information, the second location information indicating a location of an image file which represents a resource image, the resource image representing the same object as the thumbnail image, a number of pixels of the resource image being greater than a number of pixels of the thumbnail image; and executing a specific process by using the second location information included in the first type of response, the specific process including a process of causing a print execution unit of the data processing device to execute a print according to the image file.

10. A non-transitory computer-readable medium storing computer-readable instructions for a control device for a data processing device configured separately from the control device, wherein the computer-readable instructions, when executed by a processor of the control device, cause the control device to perform:

receiving first location information indicating a location of specific web page data via the data processing device, in a case where a terminal device comprising a web browser receives the specific web page data from a specific service providing server by using a first type of wireless communication and sends the first location information to the data processing device by using a second type of wireless communication, the second type of wireless communication being a short distance wireless communication having a shorter wireless communication distance than the first type of wireless communication, the specific web page data representing a thumbnail image;

sending a specific command not including authentication information to the specific service providing server by using the first location information;

receiving a specific response including second location information indicating a location of an image file which represents a resource image from the specific service providing server, the specific response being a response which is sent from the specific service providing server in a case where the specific service providing server is capable of executing a data providing service in response to the specific command, the resource image representing the same object as the thumbnail image, a number of pixels of the resource image being greater than a number of pixels of the thumbnail image; and executing a specific process in a case where the specific response is received, wherein the specific process includes:

a process of generating a template for the data processing device to acquire the image file from the specific service providing server, the template including the second location information and a print instruction for instructing the data processing device to execute a print according to the image file;

a process of sending the template to the data processing device; and a process of causing a print execution unit of the data processing device to execute the print according to the image file.

11. A communication system comprising a control server, a terminal device, a data processing device and a specific service providing server, the terminal device comprising:

a web browser; and a processor configured to perform:

receiving specific web page data from the specific service providing server by using a first type of wireless communication; and sending first location information indicating a location of the specific web page data to the data processing device by using a second type of wireless communication, the specific web page data representing a thumbnail image, the second type of wireless communication being a short distance wireless communication having a shorter wireless communication distance than the first type of wireless communication, the data processing device comprising:

a display unit;

a print execution unit; and a processor configured to perform:

receiving the first location information from the terminal device; and sending the first location information to the control server in a case where the first location information is received from the terminal device, the control server comprising:

a processor configured to perform:

receiving the first location information from the data processing device; and causing the display unit of the data processing device to display at least N items of account information among M items of account information currently stored in the data processing device, in a case where the first location information is received from the data processing device, the M being an integer of two or more, the N being an integer which is one or more and is equal to the M or less, each of the N items of account information being available for receiving a data providing service from the specific service providing server, the processor of the data processing device configured to further perform:

providing the control server with specific authentication information corresponding to specific account information, in a case where the specific account information is selected by a user from among the N items of account information displayed on the display unit, the processor of the control server configured to further perform:

acquiring the specific authentication information from the data processing device; and sending a first type of command including the specific authentication information to the specific service providing server by using the first location information, a processor of the specific service providing server configured to perform:

receiving the first type of command from the control server; and sending a first type of response in a case where the first type of command is received from the control server, the first type of response including second location information, the second location information indicating a location of an image file which represents a resource image, the resource image representing the same object as the thumbnail image, a number of pixels of the resource image being greater than a number of pixels of the thumbnail image, and the processor of the control server configured to further perform:
  receiving the first type of response from the specific service providing server; and
  executing a specific process by using the second location information included in the first type of response, the specific process including a process of causing the print execution unit of the data processing device to execute a print according to the image file.

* * * * *